(12) United States Patent
Thompson, Sr. et al.

(10) Patent No.: US 6,302,209 B1
(45) Date of Patent: Oct. 16, 2001

(54) SURFACTANT COMPOSITIONS AND USES THEREFOR

(75) Inventors: Joseph E. Thompson, Sr., Houston; Harold D. Brannon, Spring; George Tso-Chih Woo, Houston; William R. Wood, Spring; Jeffrey C. Dawson, Spring; Marshall G. Ault, Spring, all of TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 09/151,169

(22) Filed: Sep. 10, 1998

Related U.S. Application Data
(60) Provisional application No. 60/058,363, filed on Sep. 10, 1997.

(51) Int. Cl.$^7$ .................................................. E21B 43/00

(52) U.S. Cl. ...................... 166/305.1; 166/311; 507/244; 507/259; 507/261

(58) Field of Search .................................. 166/305.1, 309, 166/311; 507/134, 135, 131, 136, 252, 259, 261, 244

(56) References Cited

U.S. PATENT DOCUMENTS

| | | | |
|---|---|---|---|
| 2,390,609 | 12/1945 | Minich | 252/316 |
| 2,620,345 | 12/1952 | Dean | 260/414 |

(List continued on next page.)

FOREIGN PATENT DOCUMENTS

| | | |
|---|---|---|
| 974539 | 9/1975 | (CA) . |
| 2090177 | 2/1993 | (CA) . |
| 1 800 712 | 5/1969 | (DE) . |
| 0004353A2 | 3/1979 | (EP) . |
| 0092242 | 10/1983 | (EP) . |
| 0207787A2 | 1/1986 | (EP) . |
| 0202940A2 | 5/1986 | (EP) . |
| 0225661A2 | 11/1986 | (EP) . |
| 0271362B1 | 12/1987 | (EP) . |
| 0295877A3 | 6/1988 | (EP) . |
| 0280341 | 8/1988 | (EP) . |
| 0 295 877 A2 | 12/1988 | (EP) . |
| 0326155A2 | 1/1989 | (EP) . |
| 0338738A1 | 4/1989 | (EP) . |
| 0390280A1 | 3/1990 | (EP) . |
| 0449257A2 | 3/1991 | (EP) . |
| 0551021A1 | 12/1992 | (EP) . |
| 0580246A1 | 7/1993 | (EP) . |
| 0785225A2 | 7/1993 | (EP) . |
| 0604988A2 | 12/1993 | (EP) . |
| 0582928-A2 * | 2/1994 | (EP) . |
| 0682940A1 | 5/1995 | (EP) . |
| 0691454A1 | 7/1995 | (EP) . |
| 0682940-A1 * | 11/1995 | (EP) . |
| 0739619-A1 * | 10/1996 | (EP) . |
| 0848029A2 | 12/1997 | (EP) . |
| 0835647-A1 * | 4/1998 | (EP) . |
| 1172950 | 12/1969 | (GB) . |
| 2116227 | 9/1983 | (GB) . |
| 03097781A | 9/1989 | (JP) . |
| 06228163A | 8/1994 | (JP) . |
| 08048964A | 8/1994 | (JP) . |
| 06228163-A * | 8/1994 | (JP) . |
| 08183249 | 7/1996 | (JP) . |
| 1482171 | 11/1995 | (RU) . |
| WO 01/09482 A1 | 2/2001 | (WO) . |

OTHER PUBLICATIONS

Burnham and Harris, "Developments in Hydrocarbon Fluids for High–Temperature Fracturing," *J. Petroleum Technology*, pp. 217–220, Feb. 1980.

Gidley, John, et al., "Recent Advances in Hydraulic Fracturing," *Society of Petroleum Engineers*, (1989).

Scharf, et al., "The Enhancement of Grease Structure Through the Use of Functionalized Polymer Systems," National Lubricating Grease Institute, 9511, published prior to Mar. 30, 1999.

Kernizan, et al. "FP Additized Greases—Part 1: Bearing and Analytical Performance," National Lubricating Grease Institute, 9911, published prior to Mar. 30, 1999.

Herman F. George, et al., "Low Temperature Rheology of Greases: Functionalized Polymer Systems," National Lubricating Grease Institute, 9808, published prior to Mar. 30, 1999.

K.J. Hole, et al., "The Enhancement of Grease Structure Through the Use of Functionalized Polymer Systems," The Lubrizol Corporation, published prior to Mar. 30, 1999.

API Recommended Practices for Standard Procedures for Evaluation of Hydraulic Fracturing Fluids, American Petroleum Institute, Second Edition, Jan. 1983.

(List continued on next page.)

*Primary Examiner*—David Bagnell
*Assistant Examiner*—Jennifer R. Dougherty
(74) *Attorney, Agent, or Firm*—O'Keefe, Egan & Peterman, LLP

(57) ABSTRACT

Solid surfactant suspension compositions are formed by combining solid surfactants, such as alpha-olefin sulfonates, with an organic base fluid, such as diesel. Solid surfactant suspensions may be combined with an aqueous carrier fluid to form surfactant-containing fluids suitable for, among other things, forming foams or for water wetting surfaces. Solid surfactant suspensions may also be combined with additive materials, such as polymer particles, to form a dispersion or emulsion. Polymer-containing solid surfactant suspensions may also be combined with aqueous carrier fluids to form, for example, viscosified, gelled, or foamed fluids. Concentration of solid surfactant materials contained in a solid surfactant suspension may be varied to affect the function the solid surfactant suspension. For example, the solid surfactant material may function as a polymer surface wetting agent, an emulsifier, a dispersant, a viscosifier, and/or a foamer in well completion and remedial and/or workover fluids.

47 Claims, 1 Drawing Sheet

U.S. PATENT DOCUMENTS

| | | | |
|---|---|---|---|
| 2,965,566 | 12/1960 | Hoeppel | 252/8.5 |
| 3,243,270 | 3/1966 | Flanagan | 44/7 |
| 3,302,717 | 2/1967 | West et al. . | |
| 3,380,529 | 4/1968 | Hendrickson . | |
| 3,483,121 | 12/1969 | Jordan . | |
| 3,505,374 | 4/1970 | Monroe | 260/439 |
| 3,528,939 | 9/1970 | Pratt et al. . | |
| 3,650,970 | 3/1972 | Pratt et al. . | |
| 3,654,990 | 4/1972 | Harnsberger et al. | 166/281 |
| 3,654,991 | 4/1972 | Harnsberger et al. | 166/281 |
| 3,654,992 | 4/1972 | Harnsberger et al. | 166/281 |
| 3,657,123 | 4/1972 | Stram . | |
| 3,723,408 | 3/1973 | Nordgren et al. . | |
| 3,730,271 | 5/1973 | Gall . | |
| 3,755,189 | 8/1973 | Gilchrist et al. | 252/316 |
| 3,757,864 | 9/1973 | Crawford et al. | 166/308 |
| 3,799,267 | 3/1974 | Ely et al. | 166/308 |
| 3,819,386 | 6/1974 | Higgins et al. . | |
| 3,821,109 | 6/1974 | Gilchrist et al. | 210/36 |
| 3,826,311 | 7/1974 | Szabo et al. . | |
| 3,846,310 | 11/1974 | Blackwell et al. | 252/8.55 |
| 3,883,404 | 5/1975 | Bocca et al. . | |
| 3,893,510 | 7/1975 | Elphingstone et al. . | |
| 3,900,070 | 8/1975 | Chatterji et al. . | |
| 3,904,541 | 9/1975 | Charlton . | |
| 3,937,283 | 2/1976 | Blauer et al. . | |
| 3,953,338 | 4/1976 | Straus et al. . | |
| 3,960,514 | 6/1976 | Teng et al. . | |
| 3,969,087 | 7/1976 | Saito et al. . | |
| 3,969,233 | 7/1976 | Lucas | 252/22 |
| 3,980,136 | 9/1976 | Plummer et al. . | |
| 3,995,705 | 12/1976 | Fischer et al. . | |
| 4,003,393 | 1/1977 | Jaggard et al. . | |
| 4,021,545 | 5/1977 | Nair et al. . | |
| 4,036,764 | 7/1977 | Fischer et al. . | |
| 4,049,858 | 9/1977 | Murphy | 428/136 |
| 4,088,190 | 5/1978 | Fischer et al. . | |
| 4,094,795 | 6/1978 | DeMartino et al. . | |
| 4,096,071 | 6/1978 | Murphy | 252/8.6 |
| 4,137,400 | 1/1979 | DeMartino et al. . | |
| 4,142,978 | 3/1979 | Murphy | 252/8.7 |
| 4,156,678 | 5/1979 | Krueger . | |
| 4,171,268 | 10/1979 | Collins | 252/32.7 |
| 4,174,283 | 11/1979 | Griffin, Jr. | 252/8.55 R |
| 4,200,540 | 4/1980 | Burnham | 252/8.55 |
| 4,242,377 | 12/1980 | Roberts et al. | 477/242 |
| 4,252,465 | 2/1981 | Broussard et al. . | |
| 4,259,428 | 3/1981 | Tsuneda | 430/115 |
| 4,282,928 | 8/1981 | McDonald et al. . | |
| 4,284,414 | 8/1981 | Bryant | 44/62 |
| 4,312,765 | 1/1982 | Block . | |
| 4,316,807 | 2/1982 | McDaniel et al. . | |
| 4,316,810 | 2/1982 | Brunham . | |
| 4,328,864 | 5/1982 | Friedman . | |
| 4,330,450 | 5/1982 | Lipowski et al. . | |
| 4,336,145 | 6/1982 | Briscoe . | |
| 4,350,601 | 9/1982 | Mosier et al. . | |
| 4,359,391 | 11/1982 | Salathiel et al. . | |
| 4,364,949 * | 12/1982 | Muntwyler et al. | 514/335 |
| 4,371,443 | 2/1983 | Keeney . | |
| 4,389,320 | 6/1983 | Clampitt . | |
| 4,415,463 | 11/1983 | Mosier et al. . | |
| 4,416,703 | 11/1983 | Scott . | |
| 4,417,415 | 11/1983 | Cysewski et al. . | |
| 4,466,890 | 8/1984 | Briscoe . | |
| 4,487,867 | 12/1984 | Almond et al. . | |
| 4,488,975 | 12/1984 | Almond . | |
| 4,514,309 | 4/1985 | Wadhwa . | |
| 4,518,040 | 5/1985 | Middleton . | |
| 4,543,131 | 9/1985 | Purinton, Jr. . | |
| 4,557,842 | 12/1985 | Pratt . | |
| 4,566,977 | 1/1986 | Hatfield . | |
| 4,571,422 | 2/1986 | Symes et al. . | |
| 4,572,295 | 2/1986 | Walley . | |
| 4,579,671 | 4/1986 | Lundberg et al. . | |
| 4,615,393 | 10/1986 | Sedillo et al. . | |
| 4,622,155 | 11/1986 | Harris et al. | 252/8.551 |
| 4,627,495 | 12/1986 | Harris et al. . | |
| 4,635,727 | 1/1987 | Anderson et al. . | |
| 4,646,837 | 3/1987 | Kruka . | |
| 4,647,603 | 3/1987 | Lundberg et al. | 523/399 |
| 4,658,036 | 4/1987 | Schilling | 548/513 |
| 4,665,982 | 5/1987 | Brown | 166/250 |
| 4,670,501 | 6/1987 | Dymond et al. . | |
| 4,679,631 | 7/1987 | Dill et al. . | |
| 4,683,954 | 8/1987 | Walker et al. . | |
| 4,751,011 | 6/1988 | Lundberg et al. . | |
| 4,753,659 | 6/1988 | Bayerlein et al. . | |
| 4,780,221 | 10/1988 | Holtmyer et al. . | |
| 4,781,845 | 11/1988 | Syrinek et al. . | |
| 4,787,994 | 11/1988 | Thorne et al. . | |
| 4,798,888 | 1/1989 | Symes et al. . | |
| 4,877,894 | 10/1989 | Huddleston | 558/113 |
| 4,892,916 | 1/1990 | Hawe et al. . | |
| 4,981,608 | 1/1991 | Gunther . | |
| 5,016,714 | 5/1991 | McCabe et al. . | |
| 5,021,170 | 6/1991 | Shumate et al. . | |
| 5,045,220 | 9/1991 | Harris et al. . | |
| 5,048,607 | 9/1991 | Phelps et al. . | |
| 5,057,233 | 10/1991 | Huddleston | 252/8.551 |
| 5,076,852 | 12/1991 | Bloys et al. . | |
| 5,082,059 | 1/1992 | Englehardt et al. | 166/308 |
| 5,111,886 | 5/1992 | Dovan et al. . | |
| 5,125,456 | 6/1992 | Hutchins et al. . | |
| 5,128,462 | 7/1992 | Zody . | |
| 5,132,271 | 7/1992 | Seitz . | |
| 5,145,590 | 9/1992 | Dawson . | |
| 5,145,912 | 9/1992 | Hutchins et al. . | |
| 5,161,615 | 11/1992 | Hutchins et al. . | |
| 5,165,477 | 11/1992 | Shell et al. . | |
| 5,190,675 | 3/1993 | Gross . | |
| 5,197,324 | 3/1993 | Keys . | |
| 5,201,370 | 4/1993 | Tjon-Joe-Pin . | |
| 5,203,834 | 4/1993 | Hutchins et al. . | |
| 5,207,934 | 5/1993 | Dovan et al. . | |
| 5,211,858 | 5/1993 | Dovan et al. . | |
| 5,213,446 | 5/1993 | Dovan . | |
| 5,225,090 | 7/1993 | Hutchins et al. . | |
| 5,226,480 | 7/1993 | Dovan et al. . | |
| 5,233,032 | 8/1993 | Zody et al. . | |
| 5,244,042 | 9/1993 | Dovan et al. . | |
| 5,246,073 | 9/1993 | Sandiford et al. . | |
| 5,247,995 | 9/1993 | Tjon-Joe-Pin et al. . | |
| 5,256,320 | 10/1993 | Todd et al. | 252/32.007 |
| 5,263,540 | 11/1993 | Dovan et al. . | |
| 5,268,112 | 12/1993 | Hutchins et al. . | |
| 5,271,464 | 12/1993 | McCabe | 166/295 |
| 5,278,203 | 1/1994 | Harms . | |
| 5,283,235 | 2/1994 | Bush et al. . | |
| 5,291,949 | 3/1994 | Dovan et al. . | |
| 5,296,164 | 3/1994 | Thach et al. . | |
| 5,310,002 | 5/1994 | Blauch et al. . | |
| 5,310,774 | 5/1994 | Farrar . | |
| 5,330,588 | 7/1994 | Gulley . | |
| 5,330,662 | 7/1994 | Jahnke et al. | 252/8.551 |
| 5,335,733 | 8/1994 | Sandiford et al. . | |
| 5,360,558 | 11/1994 | Pakulski et al. . | |
| 5,362,409 | 11/1994 | Wiggins et al. | 252/32.7 |
| 5,386,874 | 2/1995 | Laramay et al. . | |
| 5,403,501 | 4/1995 | Schwind | 252/32.7 |
| 5,416,158 | 5/1995 | Santhanam et al. . | |

| | | |
|---|---|---|
| 5,417,287 | 5/1995 | Smith et al. . |
| 5,418,217 | 5/1995 | Hutchins et al. . |
| 5,419,183 | 5/1995 | Keys . |
| 5,420,315 | 5/1995 | Uhrig et al. ............................ 554/96 |
| 5,421,412 | 6/1995 | Kelly et al. . |
| 5,449,470 | 9/1995 | Cahoon et al. ........................ 252/18 |
| 5,465,792 | 11/1995 | Dawson et al. . |
| 5,486,300 | 1/1996 | Salomon et al. ....................... 252/18 |
| 5,486,312 | 1/1996 | Sandiford et al. . |
| 5,487,838 | 1/1996 | Luciani et al. ...................... 252/49.9 |
| 5,514,645 | 5/1996 | McCabe et al. . |
| 5,515,924 * | 5/1996 | Osterhoudt ........................... 166/309 |
| 5,519,063 | 5/1996 | Mondet et al. . |
| 5,529,722 | 6/1996 | Aouad et al. . |
| 5,534,609 | 7/1996 | Lewis et al. . |
| 5,547,026 | 8/1996 | Brannon et al. . |
| 5,552,377 | 9/1996 | Kindred .............................. 507/209 |
| 5,559,082 | 9/1996 | Sanner et al. . |
| 5,562,160 | 10/1996 | Brannon et al. . |
| 5,575,335 | 11/1996 | King . |
| 5,591,701 * | 1/1997 | Thomas ............................... 507/240 |
| 5,614,010 | 3/1997 | Smith et al. ......................... 106/285 |
| 5,620,946 | 4/1997 | Jahnke et al. ........................ 507/131 |
| 5,637,557 | 6/1997 | Jahnke et al. ........................ 507/246 |
| 5,641,890 | 6/1997 | Wesley et al. . |
| 5,674,936 | 10/1997 | Lucas . |
| 5,679,280 | 10/1997 | Sasaki et al. . |
| 5,681,796 | 10/1997 | Nimerick . |
| 5,697,444 | 12/1997 | Moorhouse et al. . |
| 5,700,767 | 12/1997 | Adams . |
| 5,711,801 * | 1/1998 | Chatterji et al. ..................... 106/789 |
| 5,735,349 | 4/1998 | Dawson et al. . |
| 5,773,706 | 6/1998 | Wesley et al. . |
| 5,783,525 * | 7/1998 | Blanco et al. ....................... 507/252 |
| 5,843,873 | 12/1998 | Butke et al. ......................... 508/185 |
| 5,851,960 * | 12/1998 | Totten et al. ......................... 507/118 |
| 5,858,929 | 1/1999 | Sumiejski et al. ................... 508/162 |
| 5,874,386 * | 2/1999 | Chan et al. .......................... 507/211 |
| 6,022,834 * | 2/2000 | Hsu et al. ............................ 507/259 |
| 6,033,647 | 3/2000 | Touzan et al. ........................ 424/45 |

OTHER PUBLICATIONS

Gidley, J., Holditch, S., Nierode, D., Veatch, R., Jr., "Recent Advances in Hydraulic Fracturing," Society of Petroleum Engineers (1989).

"Surfactants for Oilfield," Witco Oleo/Surfactants Group, published prior to Mar. 30, 1999.

"Stephan Surfactants," Stepan Company, published prior to Mar. 30, 1999.

"SMA Multifunctional Resins General Bulletin," Elf Atochem North America, Inc., published prior to Mar. 30, 1999.

"The Use of SMA Resins as Multivalent Ion Complexation Agents," Elf Atochem North America, Inc., Version 3.0, Jun. 1998.

"Technical Information, SMA Fatty–Alcohol Esters", Elf Atochem North America, Inc., published prior to Mar. 30, 1999.

"Technical Information, Developmental Products, Sulfonated SMA Resins, S–SMA X1000 and S–SMA X3000", Elf Atochem North America, Inc., published prior to Mar. 30, 1999.

"Material Safety Data Sheet, Carbopol 430 Resin," BF Goodrich Chemical Division, Aug., 1980.

"Technical Data Manual—Maxi Frac," Dresser Titan, T–104B, Aug. 1980.

"Maxi–O 60—Fluid Classification"—Data Sheet, SSB No. 250.0 WGY, Mar. 7, 1977.

"Maxi–O 60—Gelling Agent Classification"—Data Sheet, Mar. 7, 1977.

"Aluminum Octoate—Chemical Classification"—Data Sheet, SSB No. 250.0 WGY, Dec. 2, 1976.

"Maxi–O Breaker—Breaker Classification"—Data Sheet, SSB No. 250.0 WGY, Mar. 7, 1977.

"Phthaloyl Chloride—Chemical Classification"—Data Sheet, May, 4, 1977.

Hendrickson et al., "Soap–Oil Systems For Formation Fracturing," The Petroleum Engineer, pp. B58, 60, 64, 66, May 1957.

"Oil Base Ultra Frac Systems," BJ–Huges Inc. Mixing Manual 607, p. 52, Mar. 1972.

"Stimulation Services Bulletin—Maxi–O 60 Gel," prepared by Larry Harrington, Western, No. 250.0 WG, Sep. 1977.

U.S. application No. 09/534,655 entitled "Gelled Hydrocarbon Compositions and Methods for Use Thereof" filed Mar. 24, 2000.

"1: What foam is and how it's used," *World Oil,* pp. 75–77, Nov. 1969.

"2: Stable foam speeds well cleanout," *World Oil,* pp. 78–83, Nov. 1969.

"Sand Concentrator for Foam Fracturing" Canadian Fracmaster, Ltd., two pages.

"Surfactants for Oilfield," Witco Oleo/Surfactants Group, 33 pages.

Aizad and Okandan, "Flow equation for foam flowing through porous media and its application as a secondary recovery fluid," Soc. Petroleum Eng. AIME, #SPE 6599, 1976.

Bentsen and Veny, "Preformed stable foam performance in drilling and evaluating shallow gas wells in Alberta," *J. Petroleum Tech.,* pp. 1237–1240, Oct. 1976.

Bernard et al., "Use of surfactant to reduce $CO_2$ mobility in oil displacement," Soc. Petroleum Eng. AIME, #SPE 8370, 1979.

Beyer et al., "Flow behavior of foam as well circulating fluid," Soc. Petroleum Eng. AIME, #SPE 3986, 1972.

Bildsen, Kesavan, Dawson, "A New Polymer Approach Applicable for the Control of Water Production," Petroleum Network Education Conferences, pp. 1–10 (includes 4 pages of Figures), 1996.

Blauer and Holcomb, "Foam fracturing shows success in gas, oil formations," *Oil and Gas Journal,* pp. 57–60, Aug. 4, 1975.

Blauer and Kohlhass, "Formation fracturing with foam," Soc. Petroleum Eng. AIME, #SPE 5003, 1974.

Brannon and Pulsinelli, "Breaker concentrations required to improve the permeability of proppant–packs damaged by concentrated linear and borate–crosslinked fracturing fluids," Petroleum Eng. AIME, #SPE 90–90 (Preprint), 1990.

Bullen, "Combination foam/fluid fracturing," *J. Canadian Petroleum Technology,* pp. 51–56, 1980.

Burnham, Harris, McDaniel, "Developments in Hydrocarbon Fluids for High Temperature Fracturing," Society of Petroleum Engineers of AIME, SPE 7546, pp. 1–7 (includes 4 pages of figures/drawings/tables), 1978.

Cameron et al., "New insights on the rheological behavior of delayed crosslinked fracturing fluids," Soc. Petroleum Eng. AIME, #SPE 18209, 1988.

Driscoll et al., "Oil base foam fracturing applied to the niobrara shale formation," Soc. Petroleum Eng. AIME, #SPE 9335, 1980.

Eakin and Eckard, "Foams purge well bore and formation waters," *Petroleum Engineer,* pp. 71–84, Jul. 1966.

Essary and Rogers, "Techniques and results of foam redrilling operations—San Joaquin Valley, California," Soc. Petroleum Eng. AIME, #SPE 5715, 1976.

Hanks and Bonner, "Transitional flow phenomena in concentric annuli," *Ind. Eng. Chem. Fundam.,* 10(1):105–112, 1971.

Hanks and Dadia, "Theoretical analysis of the turbulent flow of non–newtonian slurries in pipes," *AIChE J.,* 17(3):554–557, May 1971.

Hanks and Larsen, "The flow of power–law non–newtonian fluids in concentric annuli," *Ind. Eng. Chem. Fundam.,* 18(1):33–35, 1979.

Harris and Reidenbach, "High temperature rheological study of foam fracturing fluids," Soc. Petroleum Eng. AIME, #SPE 13177, 1984.

Holcomb and Wilson, "Foamed acidizing and selective diverting using stable foam for improved acid stimulation," *Southwestern Petroleum Short Course,* pp. 67–74. (Undated).

Holcomb et al., "Chemistry, physical nature, and rheology of aqueous stimulation foams," Soc. Petroleum Eng. AIME, #SPE 9530, 1981.

Holcomb, "Foam: for fracturing and acid stimulation," *Drilling,* p. 46, Jan. 1982.

Holcomb, "Foam: for fracturing and acid stimulation," *Drilling,* p. 130, Feb. 1982.

Holcomb, "Foam: for fracturing and acid stimulation," *Drilling,* p. 199, May 1982.

Holm, "Status of $CO_2$ and hydrocarbon miscible oil recovery methods," Soc. Petroleum Eng. AIME, #SPE 5560, 1975.

Holm, "The mechanism of gas and liquid flow through porous media in the presence of foam," Soc. Petroleum Eng. AIME, #SPE 1848, 1967.

Kanda and Schechter, "On the mechanism of foam formation in porous media," Soc. Petroleum Eng. AIME, #SPE 6200, 1976.

King, "Factors affecting dynamic fluid leakoff with foam fracturing fluids," Soc. Petroleum Eng. AIME, #SPE 6817, 1977.

Komar and Yost, "Practical aspects of foam fracturing in the devonian shale," Soc. Petroleum Eng. AIME, #8345, 1979.

Krug, "Foam pressure loss in vertical tubing," *Oil and Gas Journal,* pp. 74–76, Oct. 6, 1975.

Leach and Yellig, "Compositional model studies: $CO_2$–oil displacement mechanisms," Soc. Petroleum Eng. AIME, #SPE 8368, 1979.

Lord et al., "General turbulent pipe flow scale–up correlation for rheologically complex fluids," *Soc. Petroleum Eng. J.,* pp. 252–258, Sep. 1967.

Maini and Ma, "Relationship between foam stability measured in static tests and flow behavior of foams in porous media," Soc. Petroleum Eng. AIME, #SPE 13073, 1984.

Metzner et al., "A method for the measurement of normal stresses in simple shearing flow," *Transactions Soc. Rheology,* pp. 133–147 (1961).

Millhone et al., "Factors affecting foam circulation in oil wells," Soc. Petroleum Eng. AIME, #SPE 4001, 1972.

Neill et al., "Field and Laboratory Results of Carbon Dioxide and Nitrogen in Well Stimulation," *J. Petroleum Technology,* pp. 244–248, Mar. 1964.

Reidenbach et al., "Rheological study of foam fracturing fluids using nitrogen and carbon dioxide," Soc. Petroleum Eng. AIME, #SPE 12026, 1983.

Rohret, "Stimulation of the niabrara formation using foamed methanol–water," Soc. Petroleum Eng. AIME, #SPE 7174, 1978.

Smith and Holcomb, "Foamed hydrocarbons: an effective and economical alternative to conventional stimulation methods," *Southwestern Petroleum Short Course,* pp. 65–72 (Undated).

Watkins et al., "A new crosslinked foamed fracturing fluid," Soc. Petroleum Eng. AIME, #SPE 12027, 1983.

Wendorff and Ainley, "Massive hydraulic fracturing of high–temperature wells with stable frac foams," Soc. Petroleum Eng. AIME, #SPE 10257, 1981.

Rhône–Poulence, *Surfactants for Energy,* p. 1–5, 1991.

Texaco Chemical Company, *Our Chemical Products,* p. 1–37, 1981.

Chemron Corporation, p. 1–29. (Undated).

Ethox, p. 1–16. (Undated).

Stepan, p. 1–19. (Undated).

Stepan, p. 1–23. (Undated).

Co–pending U.S. application No. 08/869,388 filed Jun. 5, 1997 (BJSC:165).

Co–pending U.S. application No. 09/049,610, filed Mar. 27, 1988 (BJSC:174).

Co–Pending U.S. application No. 60/127,298 filed Mar. 30, 1999.

Co–Pending U.S. application No. 60/129,770 filed Apr. 15, 1999.

Co–Pending U.S. application No. 09/151,169 filed Sep. 10, 1998.

Kang and Pettitt, "Xantham, Gellan, Welan and Rhamsan," *Industrial Gums,* $3^{rd}$ Edition, pp. 341–397, 1993.

"Xantham Gum: Natural Biogum for Scientific Water Control," Kelco Div., Merck & Co., $4^{th}$ Edition, 1992.

Beck, et al., "A Clarified Xantham Drill–In Fluid for Prudhoe Bay Horizontal Wells," SPE 25767, 1993.

Dyke and Crockett, "Prudhoe Bay Workovers: Best Practices for Minimizing Productivity Impairment and Formation Damage," SPE 26042, 1993.

Parks et al., "Evaluation of Polymers for Oilfield Use: Viscosity Development, Filterability and Degradation," *Water–Soluble Polmyers for Petroleum Recovery,* Plenum, 1988.

Seheult et al., "Biopolymer Fluids Eliminate Horizontal Well Problems," *World Oil,* Jan. 1990.

Motley and Hollamby, "Novel Milling Fluid Saves Time, Cuts Costs," *World Oil,* Mar. 1987.

Beihoffer et al., "Cationic Polymer Drilling Fluid Can Sometimes Replace Oil–Based Mud," *Oil & Gas Journal,* Mar. 16, 1992.

Powell et al., "Xanthan and Whelan: The Effects of Critical Polymer Concentration on Rheology and Fluid Performance," SPE 22066, 1991.

Kelco Oil Field Group Product Literature and Technical Information, Kelco Oil. (Undated).

Abdon et al., "The Development of a Defloculated Polymer Mud for HTHP Drilling," SPE 17924, 1989.

Zamora et al., "Hole–Cleaning Study of Polymer–Based Drilling Fluids," SPE 26329, 1993.

Downs, "Formate Brines: Novel Drilling and Completion Fluids for Demanding Environments," SPE 25177, pp. 267–279, 1993.

Engel et al., "553–ft. Gravel Pack Uses Clarified XC Polymer: Development and Application in Beluga River, Alaska," SPE 19750, 1989.

Houchin et al., "Reducing Formation Damage Through Two–Stage Polymer Filtration," SPE 15408, 1986.

Co–Pending U.S. application No. 09/294,833 filed Apr. 19, 1999.

"FLOCON Bipolymer 4800C," Pfizer Product Information, Oil Field Focus, Aug. 1982.

Encyclopedia of Chemical Technology, Edited by Raymond E. Kirk and Donald F. Othmer, vol. 6, pp. 147, 161, 165, 172–177, 198, 261–262, 298–299.

Gidley, et al. "Recent Advances in Hydraulic Fracturing," SPE; Chapter 7, "Fracturing Fluids and Additives," John W. Ely, 1989.

Prud'Home, Robert K., "Rheological Characterization of Fracturing Fluids," American Petroleum Institute Prac Project 86–45, Department of Chemical Engineering, Princeton University. (Undated).

"The Use of SMA Resins as Multivalent Ion Complexation Agents" SMA Multifunctional Resins General Bulletin, Elf Atochem, Version 3.0, Jun. 1998.

Pattison, "Fatty acids and their industrial applications," Marcel Dekker, Inc., New York, NY 209–220, 1968.

Encyclopedia of Chemical Technology, Edited by Raymond E. Kirk and Donald F. Othmer, Third Edition, John Wiley & Sons, Inc., 4:812–871, 1978.

Encyclopedia of Chemical Technology, Edited by Raymond E. Kirk and Donald F. Othmer, Third Edition, John Wiley & Sons, 9:795–831, 1980.

David P. Garner and G. Allan Stahl, "The Effects of Hostile Environments on Coatings and Plastics," ACS Symp. Series 229, American Chemical Society, 1983.

"Reactions of SMA Resin," SMA Multifunctional Resins General Bulletin, Elf Atochem. (Undated).

"FLOCON 4800 Profile Modification Field Experience Update," Pfizer Oilfield Focus, Jan. 1985.

Ralston, A. W., "Fatty Acids and Their Derivatives," John Wiley & Sons, pp. 887–909, 1948.

Chevassus et al., "The Stabilization of Polyvinyl Chloride," Edward Arnold Ltd., pp. 108–117, 1963.

Elliot, "The Alkaline Earth and Heavy Metal Soaps," McGraw–Hill Encyclopedia of Science and Technology, Reinhold Publishing New York, pp. 393–394 (1960).

Witco Corporation, "Humko Chemical Product Guide," 68810M GEN:001 (1998).

Akzo Chemicals Inc., "Industrial Surfactants Nitrogen derivatives," General Catalog Bulletin 92–1 (1992).

* cited by examiner

SURFACTANT COMPOSITIONS AND USES THEREFOR

The present application claims priority on co-pending U.S. Provisional Patent Application Ser. No. 60/058,363 filed Sep. 10, 1997. The entire text of the above-referenced disclosure is specifically incorporated by reference herein without disclaimer.

BACKGROUND OF THE INVENTION

1. Field of the Invention

This invention relates generally to surfactant compositions and, more specifically, to surfactant compositions comprising suspensions of solid surfactants. In particular, this invention relates to suspensions of a solid surfactant, such as an alpha olefin sulfonate, in an organic base fluid, such as diesel or vegetable oil. These suspensions may be optionally combined with additive materials, such as polymers, and/or with aqueous carrier fluids. This invention also relates to various uses for solid surfactant compositions, including as wetting agents, emulsifiers, dispersants, viscosifiers, gelling agents and/or foamers, such as used in drilling, completion and remedial or workover well applications.

2. Description of Related Art

Surfactant-containing solutions are used for many purposes. For example, in oil and gas well applications, these solutions may be employed as part of a carrying fluid, such as a drilling fluid, for supporting and removing solids and liquids from a wellbore. Surfactant-containing solutions may also be utilized in gelled or otherwise thickened fluids for purposes of preventing loss circulation and/or cleaning materials from a wellbore. In addition to intra-wellbore uses, surfactant-containing solutions may also be utilized as part of formation stimulation or hydrocarbon recovery operations. For example, surfactant-containing fluids may be utilized as part of gelled or viscosified liquids used in hydraulic fracturing treatments. These viscosified fluids serve the purpose of initiating a fracture in a formation and of carrying proppant into the formation. Gelled or viscosified surfactant-containing fluids may also be utilized as part of acid jobs or other stimulation treatments. In this capacity, gelled fluids may be used as a diversion agent for diverting acid or other stimulation fluids into less permeable parts of a formation, or those parts of a formation having greater formation damage. In other cases, surfactant-containing fluids may be employed as part of tertiary recovery operations, such as in miscible floods, or to water wet formation surfaces.

In many of the above listed applications, surfactant-containing fluids may also be foamed. In most cases, foams include energizing phase gases such as nitrogen and/or carbon dioxide mixed with water in a suitable surfactant. Foams may be employed in many applications. For example, foams may be employed as part of a stimulation treatment, such as an acid or hydraulic fracture treatment. When employed as part of a stimulation treatment, foams help increase well clean-up efficiency and decrease well clean-up time by expanding to provide energy or pressure to support well clean-up following treatment. Other uses for foams include as a relatively lightweight circulating fluid which may be employed, for example, to clean out wellbores penetrating formations having relatively low bottom hole pressures.

In other cases, surfactants may be employed to assist in the hydration of polymers employed in solutions such as gelled treatment fluids. In such applications, surfactants have been used as dispersant agents in slurries of polymer particles. In this capacity, surfactants help disperse the polymer particles in such a way that the polymers may hydrate, gel and/or increase the viscosity of the fluid. Such surfactant-containing polymer solutions may also be foamed with the addition of a separate foamer prior to addition to an energizing phase such as carbon dioxide, nitrogen or a mixture thereof. Foamers, such as betaines, have typically been employed in water-based foam fracturing applications.

In the past, water-based fracturing foams have typically been made by mixing a dry polymer with water and foamer before addition of an energizing phase. However, it has been found that the use of a dry polymer typically requires batch mixing of the polymer with water to form a polymer solution prior to foaming of the treatment fluid. Disadvantages of this method include increased energy required from surface pumps due to increased viscosity of the polymer solution, and disposal of pre-mixed polymer solution in those cases where a fracture treatment has to be prematurely terminated. To address the problems presented by dry polymer systems, slurry polymer systems have been developed. A typical slurry polymer system includes a slurry of polymer particles in a hydrocarbon fluid base, for example a 50/50 mix of diesel oil and guar or guar-based polymer. By using a hydrocarbon fluid-based polymer slurry, several advantages are realized. First, the polymer may be supplied in liquid form to an aqueous treatment carrier fluid as a job is pumped. This is known as a "continuous mixing" process. Such a process offers the advantage of improved metering and reduced surface pump horsepower. Second, if a fracturing job has to be prematurely discontinued, no unused polymer solution remains which must be disposed of.

Although continuous mix processes utilizing hydrocarbon fluid-based polymer slurries offer many advantages, problems still persist. For example, separate process streams are typically required to supply a number of ingredients, such as surfactants for dispersing and water wetting the polymer particles and a separate roamer. These process streams are in addition to other process streams required for emulsifiers, cross-linkers, etc. With each additional process stream, a continuous mix system becomes increasingly complicated in terms of equipment and operating procedures, especially when delivery rate changes are required. Another problem encountered with continuous mixed hydrocarbon fluid-based polymer systems is that diesel oil and other liquid hydrocarbons used in such systems tend to act as defoamers, making the use of a slurried polymer system with a foamer such as betaine undesirable due to lack of stability of the foam produced.

Multi-component foamer systems have been developed in an attempt to address foam instability problems encountered with the use of hydrocarbon fluid-based polymer slurries. For example, a water-based roamer comprising an alkyl betaine, a liquid alpha-olefin sulfonate, a hydrophilic solvent and water has been developed. Such a foamer is typically added to a fracture gel comprising a polymer/hydrocarbon slurry mixed with brine prior to the addition of an energizing phase. Although such foamer compositions may partially address foam stability problems in the presence of hydrocarbon-based fluids, several disadvantages with such systems remain. For example, such foamers typically comprise several components, thus increasing the compositional complexity of the system. In addition, such foamers typically must be added as a separate process stream to the fracturing gel after addition of an aqueous carrier fluid and after crosslinking, thereby increasing operational complexity. Furthermore, there exists limits to the amount of active foaming components in the foamer composition which may be dispersed in the solvent component of such a foamer system. Consequently, foamer delivery loading is limited by economics. For example, utilizing in excess of 30 gallons per thousand gallons of a liquid betaine/liquid alpha-olefin sulfonate/water-based foamer having a maximum of about 40% concentration of liquid alpha-olefin sulfonate surfactant typically is uneconomical.

SUMMARY OF THE INVENTION

The disclosed compositions and processes involve solid surfactant particle suspension compositions. As just one of many surprising advantages, embodiments of these compositions offer an effective, economical, and environmentally compatible replacement for hydrocarbon based polymer suspensions that contain surfactants such as ethoxylated nonylphenols.

The disclosed materials may be suspended in an organic base. These compositions may be used, for example, as wetting agents, dispersants, or as foaming agents in oil and gas completion processes. The disclosed surfactant combinations may also be formulated in polymer suspensions or a variety of other particle compositions, in environmentally compatible oil bases. Besides oil, the disclosed method may be used with other organic materials including, but not limited to, conventional hydrocarbons and natural organic liquids (such as vegetable products). In one example embodiment, the disclosed surfactant particle suspension compositions may be used for the efficient hydration of water based polymers used in oil and gas completion processes. In this regard, polymers that may be used in this invention may include, but one not limited to, natural polymers (such as polysaccharides), biopolymers (such as xanthan or carrageenan), synthetic polymers (such as polyacrylates), or other materials or particles used to control fluid loss in well treatment fluids (such as hydraulic fracturing fluids).

The disclosed compositions may be selected from a group of solid surfactant chemicals including solid alpha olefin sulfonates ("AOS"), alcohol ethoxylates, alcohol ether sulfates ("AES"), betaines, sulfosuccinate esters, alkyl sulfates, alkyl aryl sulfonates, and mixtures thereof The disclosed surfactant compositions may be used in conjunction with select delivery systems.

Also disclosed is a process involving the use of composition(s) for the viscosification and subsequent foaming of polymer suspensions in fluids used in conjunction with stimulation (e.g., fracturing, acidizing, etc.), drilling, completion, remedial and/or workover operations in the oil and gas industry. In this process surfactant combinations may be used to suspend particles. Manipulation of the surfactant combination or concentration may also facilitate effective polymer solvation and subsequent foaming of the final mixture. Advantageously these particle suspension compositions may be used to facilitate accurate additive delivery in oil and gas completion processes. The surfactant compositions may include, for example, solid alpha olefin sulfonates ("AOS"), alcohol ethoxylates, alcohol ether sulfates, betaines, sulfosuccinate esters, alkyl sulfates, alkyl aryl sulfonates and mixtures thereof in conjunction with particle surfactant suspension materials, such as organophilic clays, phosphate esters, etc.

In one respect, this invention is a method for forming a solid surfactant suspension including combining a solid surfactant and an organic base fluid, the solid surfactant being suspended in the organic base fluid to form the solid surfactant suspension. The method may further introducing the solid surfactant suspension into a subterranean formation having a water saturation, so that at least a portion of the solid surfactant dissolves in the water to water wet the formation, form a foam with the water, or do both.

In another respect, this invention is a method for forming a treatment fluid including providing a solid surfactant suspension, the surfactant suspension including a solid surfactant suspended in an organic base fluid; and combining the solid surfactant suspension with an aqueous carrier fluid to form the treatment fluid. The solid surfactant may include at least one of a solid alpha olefin sulfonate, alcohol ethoxylate, alcohol ether sulfate, betaine, sulfosuccinate ester, alkyl sulfate, alkyl aryl sulfonate or a mixture thereof. A particular alpha-olefin sulfonate may be at least one of a sodium, ammonium or potassium alpha-olefin sulfonate, or a mixture thereof. In one embodiment, the alpha-olefin sulfonate may have up to about 20 carbon atoms. The solid surfactant may further include a solid betaine which may be, for example, a cocoamidopropyl betaine, and the alpha olefin sulfonate may have from about 12 to about 14 carbon atoms. The solid surfactant suspension and the aqueous carrier fluid may be combined using a continuous mixing process. The organic base fluid may include diesel, a refined kerosene, sunflower oil, or a mixture thereof. The solid surfactant suspension may include from about 50% to about 70% by weight of solid surfactant. The method may further include introducing the treatment fluid into a well. The solid surfactant suspension further may include an additive particle suspended in the organic base fluid. The additive particle may include a polymer which may be, among other things, a polysaccharide, a polyacrylate, or a mixture thereof. The polymer may be crosslinked. In one embodiment, the solid surfactant suspension may include from about 50% to about 70% by weight of solid surfactant and from about 5% to about 60% by weight of the polymer. The method may further include combining the treatment fluid with an energizing phase to form a foamed treatment fluid. The energizing phase may be carbon dioxide, nitrogen, or a mixture thereof.

In another respect, this invention is a method for forming a polymer-containing treatment fluid including combining polymer particles and a solid surfactant in an organic base to form a polymer-containing solid surfactant suspension, and combining the polymer-containing solid surfactant suspension with an aqueous carrier fluid to form the polymer-containing treatment fluid. At least a portion of the solid surfactant dissolves in the aqueous carrier fluid and water wets the polymer particles. The aqueous fluid may include at least one of fresh water, brine, acid, cement slurry or a mixture thereof. The solid surfactant and the polymer particles are typically insoluble in the organic base. The solid surfactant may include at least one of a solid alpha olefin sulfonate, alcohol ethoxylate, alcohol ether sulfate, betaine, sulfosuccinate ester, alkyl sulfate, alkyl aryl sulfonate or a mixture thereof. An alpha-olefin sulfonate may be at least one of a sodium, ammonium, or potassium alpha-olefin sulfonate, or a mixture thereof. The alpha-olefin sulfonate may have up to about 20 carbon atoms. The solid surfactant further may include a solid betaine. The solid betaine may include a cocoamidopropyl betaine and wherein the alpha olefin sulfonate may have from about 12 to about 14 carbon atoms. In this embodiment, the solid surfactant suspension and the aqueous carrier fluid may be combined using a continuous mixing process. The organic base fluid may include diesel. The solid surfactant suspension may include from about 50% to about 70% by weight of solid surfactant. The polymer may include a polysaccharide, a polyacrylate, or a mixture thereof. The solid surfactant suspension may include from about 50% to about 70% by weight of solid surfactant and from about 5% to about 60% by weight of the polymer. The polymer may be crosslinked.

In another respect, this invention is a method for treating a well, including providing a solid surfactant suspension, the surfactant suspension including a solid surfactant suspended in an organic base fluid; combining the solid surfactant suspension with an aqueous carrier fluid to form a treatment fluid; and introducing the treatment fluid into the well. The method may further include introducing the treatment fluid into a subterranean formation, wherein at least a portion of the solid surfactant dissolves in the aqueous carrier fluid to water wet the formation. The solid surfactant may include at least one of a solid alpha olefin sulfonate, alcohol ethoxylate, alcohol ether sulfate, betaine, sulfosuccinate ester, alkyl sulfate, alkyl aryl sulfonate or a mixture thereof The alpha-olefin sulfonate may be at least one of a sodium, ammonium or potassium alpha-olefin sulfonate, or a mixture thereof The alpha-olefin sulfonate may have up to about 20 carbon atoms. The solid surfactant further may include a solid betaine. In one embodiment, the solid betaine may include a cocoamidopropyl betaine and the alpha olefin sulfonate may have from about 12 to about 14 carbon atoms. The solid surfactant suspension and the aqueous carrier fluid may be combined using a continuous mixing process. The organic base fluid may include diesel. The solid surfactant suspension may include from about 50% to about 70% by weight of solid surfactant. The method may further include combining the treatment fluid with an energizing phase to form a foamed treatment fluid prior to introducing the treatment fluid into the well. The method may further include combining the solid surfactant suspension with a polymer prior to combining the solid surfactant suspension with an aqueous carrier fluid, and the solid surfactant suspension may include from about 50% to about 70% by weight of solid surfactant and from about 5% to about 60% by weight of the polymer. Proppant may be combined with the treatment fluid prior to introducing the treatment fluid into a well. The energizing phase may be carbon dioxide, nitrogen, or a mixture thereof. The method may include combining the solid surfactant suspension with additive particles prior to combining the solid surfactant suspension with an aqueous carrier fluid. The additive particle may include a polymer and the treatment fluid may be a polymer treatment fluid. The polymer treatment fluid may be a gelled fluid. The solid surfactant suspension may be combined with the solid surfactant suspension to form a polymer-containing suspension including from about 50% to about 70% by weight of solid surfactant and from about 5% to about 60% by weight of the polymer.

In another respect, this invention is a solid surfactant suspension including a solid surfactant and an organic base fluid. The solid surfactant suspension further may include an additive particle suspended in the organic base fluid. The additive particle may include a polymer.

In another respect, this invention is a polymer-containing solid surfactant suspension including polymer particles and a solid surfactant in an organic base. The solid surfactant may include at least one of a solid alpha olefin sulfonate, alcohol ethoxylate, alcohol ether sulfate, betaine, sulfosuccinate ester, alkyl sulfate, alkyl aryl sulfonate or a mixture thereof. An alpha-olefin sulfonate may be at least one of a sodium, ammonium, or potassium alpha-olefin sulfonate, or a mixture thereof. An alpha-olefin sulfonate may have up to about 20 carbon atoms. The organic base fluid may include diesel. The solid surfactant suspension may include from about 50% to about 70% by weight of solid surfactant. The polymer may include a polysaccharide, a polyacrylate, or a mixture thereof. The polymer may be crosslinked. The solid surfactant suspension may include from about 50% to about 70% by weight of solid surfactant and from about 5% to about 60% by weight of the polymer.

DESCRIPTION OF ILLUSTRATIVE EMBODIMENTS

Figure 1:
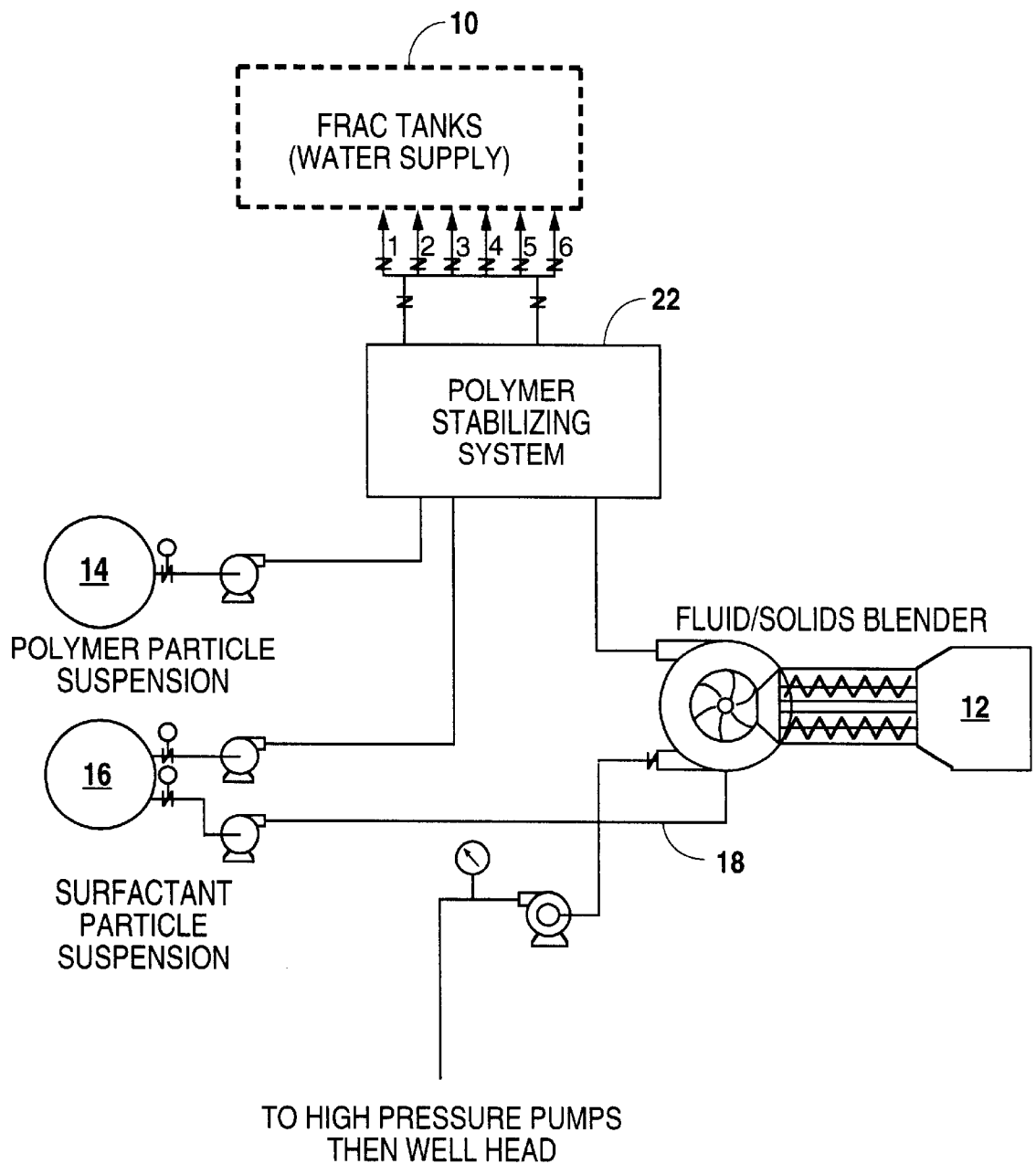
FIG. 1 shows a process flow diagram for mixing the solid surfactant suspension according to one embodiment of the disclosed method and compositions.

The disclosed methods and compositions provide solid surfactant particles suspended in an organic base. These solid surfactants may be employed for a multitude of surfactant-related purposes including, but not limited to, as wetting agents, emulsifiers, dispersants, viscosifiers, gelling agents and/or foamers, such as used in drilling, completion and remedial or workover well applications. Advantageously, compositions employing these surfactants are more effective, economically and/or environmentally desirable than previous surfactant compositions, such as liquid alpha-olefin sulfonates and ethoxylated nonylphenols. Most advantageously, the disclosed solid surfactants and compositions thereof are versatile and capable of performing multiple functions, typically without the necessity of other chemical compounds, such as additional surfactants. The disclosed [solid] surfactant compositions may be selected from a group of [solid] surfactant chemicals including, but not limited to, solid alpha olefin sulfonates ("AOS"), alcohol ethoxylates, alcohol ether sulfates, betaines, sulfosuccinate esters, alkyl sulfates, alkyl aryl sulfonates, and mixtures thereof.

By employing a surfactant in a solid form, significant advantages are achieved over previous surfactant compositions employing liquid surfactants, such as liquid alpha-olefin sulfonates. For example, liquid surfactants may cause undesirable effects in surface mixing and pumping equipment. This is especially the case with foaming agents. For example, early generation of foam may cause equipment malfunctions and erratic proppant delivery. Advantageously, some embodiments of the disclosed solid surfactant systems address such problems by offering the advantage of slow dissolution of surfactant material. In these embodiments, a surfactant's foaming properties may develop downstream of the surface equipment. In addition, because the surfactants are present in an organic suspension in solid form, concentration of the surfactants may be easily varied so as to change the characteristics of the suspension, as well as to vary the function that the surfactant performs. Furthermore, a higher solid concentration is typically possible when using an organic base fluid, than when using a typical aqueous base surfactant system, offering the possibility for achieving increased surfactant concentration. As used herein, a "solid surfactant" includes any non-liquid material or compound having surfactant properties. Such solid surfactants may be available as, or take the form of, powders, pastes, solid dispersions, prill, beads, etc.

In various embodiments of the disclosed method and composition, a solid surfactant may be employed in an organic suspension with or without other particulate matter, such as polymer particles. In those applications in which they are employed with a polymer, the surfactants may serve to disperse and facilitate hydration of polymers, as well as to facilitate viscosification, gelling, and/or foaming of fluids. A solid surfactant may function in other and similar roles and/or may be later combined with a polymer. For example, when employed in a polymer-containing suspension, a solid surfactant composition may be employed as a dispersant and wetting agent for the polymer to assist the polymer in hydration and/or in the dispersal of an organic-based fluid from the polymer. Solid surfactants may be mixed directly with other particulates such as polymer, or added to a polymer suspension as a separate stream. Solid surfactants used in polymer-containing suspensions may also be employed to viscosify, and/or foam these polymer-containing suspensions once they have been combined with an aqueous carrier fluid. When employed without polymer, the disclosed solid surfactants may be employed in any surfactant-related application known to the art. Possible surfactant-related applications include, but are not limited to, as a wetting agent to water wet subterranean formation surfaces and improve oil recovery by facilitating oil mobility in the formation, and alone or in combination with other surfactants to reduce surface tension and/or improve water wetting of formation or other surfaces.

Advantageously, solid surfactants remain in solid form in the disclosed hydrocarbon suspensions until exposed to an aqueous carrier fluid. Upon exposure to an aqueous fluid the solid surfactants dissolve and help disperse and hydrate polymer material when present. In higher concentrations, the dissolved solid surfactants also provide the foaming surfactants needed to provide a substantially stable foam in the is presence of the hydrocarbon base fluid component of an organic-based polymer suspension. Therefore, in one embodiment a combination polymer dispersant and foaming agent is provided that may be added as a single component of a single process stream. In addition, these surprising results are achieved when the disclosed solid surfactant compositions are employed in an organic-based polymer slurry itself or in an organic suspension alone, without the necessity of separate additives to a polymer gel or well treatment fluid.

The disclosed solid surfactants and compositions thereof may be employed in a variety of applications including, but not limited to, well completion, workover, and stimulation applications. Solid surfactants may be used to provide a single surfactant suspension composition which may be employed to fulfill one or more functional roles in a treatment fluid, without the necessity for other surfactants or process streams as required in previous methods. Surprisingly, the function of a solid surfactant may be varied simply by adjusting the concentration of the solid surfactant in an organic-based suspension. For example, the solid surfactants may be present in a polymer-containing organic-based suspension in sufficient amounts to disperse and aid in the hydration of polymer material when the hydrocarbon-based polymer suspension is added to an aqueous-based well treatment carrier fluid, for example to achieve a gelled fluid for use in applications such as hydraulic fracturing, acid treatments, well clean-outs, fluid loss control, etc. By merely increasing the concentration of solid surfactant material in the polymer-containing organic-based suspension, a foamed liquid gel may be achieved, without the need for additional foamer compositions or separate process streams, thus greatly simplifying the process and making it ideal for continuous mix applications.

Solid surfactants typically employed in the disclosed method are those that typically do not dissolve in an organic base fluid, and may therefore be concentrated in an organic-based suspension. Because the disclosed solid surfactants may be concentrated, it is possible to change the rate of delivery for the amount of surfactant being added per unit volume in such a way that the action of a solid surfactant may be controlled, for example, as a polymer wetting agent at lower concentrations, a formation wetting agent at higher concentrations and a foamer at even higher concentrations. Advantageously, increased concentration of solid surfactant allows the solid surfactant to be concentrated to the point that the foam-destabilizing effects of diesel and other organic fluids are overcome and a stable foam may be achieved with these fluids. In this regard, increased concentrations of solid surfactants act to override the foam destabilizing effects of organic-based fluids and to disperse the organic-based fluid sufficiently to create a foam. Advantageously, such stable foams may be achieved without the addition of one or more extra process streams containing wetting agents, surfactants and/or separate foamers.

As an additional advantage, environmentally acceptable compositions comprising solid surfactants such as solid alpha olefin sulfonates ("AOS"), alcohol ethoxylates, alcohol ether sulfates, betaines, sulfosuccinate esters, alkyl sulfates, and mixtures thereof are provided. These environmentally compatible surfactant formulations may be used to replace less environmentally desirable surfactant solutions containing phenol-based surfactants.

Solid Surfactant Materials

In the practice of the disclosed method and compositions, solid surfactants typically include any solid surfactant suitable for forming dispersions in organic base fluids. Typically such solid surfactants have the property of relatively slow dissolution into aqueous solvents, and are typically substantially insoluble in organic solvents, although slight solubility may occur in aromatic organic solvents or those that contain nitrogen or oxygen, such as alcohols, ethers, or amines. Such solid surfactants may be employed alone or in combination with other solid surfactants. More typically, a solid surfactant is at least one of a solid alpha olefin sulfonate ("AOS"), alcohol ethoxylate, alcohol ether sulfate, betaine, sulfosuccinate ester, alkyl sulfate, alkyl aryl sulfonate or a mixture thereof. Even more typically, a solid surfactant is a solid alpha-olefin sulfonate, even more typically a solid alpha-olefin sulfonate derived from alpha olefins having a number of carbon atoms high enough to assure solidification at ambient temperature, and even more typically alpha olefins having a number of carbon atoms sufficient to ensure this characteristic up to about 20 carbon atoms. Even more typically, a solid alpha-olefin sulfonate is derived from alpha olefins having between about 10 and about 20 carbon atoms, and most typically between about 12 and about 14 carbon atoms. In this regard, it will be understood with benefit of this disclosure that an aliphatic chain of a surfactant may be either linear or branched analogs.

A solid alpha-olefin sulfonate may also be of any type suitable for use as a surfactant. Examples of suitable solid alpha-olefin sulfonate compounds include, but are not limited to, ammonium alpha-olefin sulfonates, sodium alpha-olefin sulfonates, potassium alpha-olefin sulfonates, or mixtures thereof. Most typically, a solid alpha-olefin sulfonate is derived from an alpha-olefin having a linear or branched structure, and is a mixture of hydroxy alkane sulfonate analogs and alkene sulfonates. Typically, an alpha-olefin sulfonate has one of the following structures (although it will be understood with benefit of this disclosure that other structures may be possible):

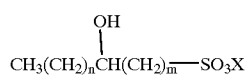 (I)

 (II)

where:
m=from about 2 to about 4;
n=from about 6 to about 14; and
X=H, Na, K, NH$_4$ ion, or alternatively
X=Na, K, NH$_4$ ion A most typical solid alpha-olefin sulfonate is a surfactant having from about 12 to about 14 carbon atoms known as "BIO-TERGE AS90 BEADS" available from Stepan. Other specific examples of suitable solid alpha-olefin sulfonates include "WITCONATE AOK" available from Witco.

Suitable solid betaines for those embodiments employing one or more betaine solid surfactants include any solid betaine suitable for use as a surfactant. Suitable solid betaines include, but are not limited to, amphoteric surfactants of the fatty acid amido alkyl betaine type, such as cocoamidopropyl betaines and mixtures of cocoamidopropyl betaines having the following structure:

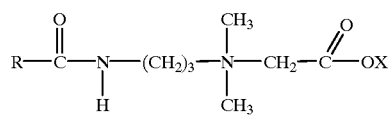 (III)

where
R=coco group typically having a mixture of chain lengths ranging from about 8 to about 16 carbon atoms; and
X=H, Na, K, NH$_4$ ion, or alternatively
X=Na, K, NH$_4$ ion A typical coco group consist of coconut fatty acids. In this regard, coconut fatty acids may include C12 (about 10 to about 15%); C14 (about 16 to about 20%); C16 (about 8 to about 10%); oleic (about 5 to about 6%); and chains with carbons less than C12 (about 10 to about 15%). Examples of solid betaine compositions typically employed are fatty acid amido alkyl betaines known as "TEGO BETAINE C," "TEGO BETAINE CK," and most typically a cocaamidopropylbetaine known as "TEGO BETAINE CDK" available from Goldsmith.

Suitable ethoxylated alcohols ("EA") for those embodiments employing one or more solid ethoxylated alcohols include any solid ethoxylated alcohols suitable for use as a surfactant and most typically take the form of a paste or bead. Typically, these are ethoxylated alcohols having about 8 or more carbon atoms, typically from about 8 to about 20 carbon alcohols ethoxylated with from about 6 to about 40 moles of ethylene oxide. These generally include both linear and branched chain alcohols and include, but are not limited to, ethoxylated alcohols and mixtures of ethoxylated alcohols having the general structure:

 (IV)

where
n is about 7 to about 19 m is from about 6 to about 40

A most typical solid ethoxylated alcohol is "SURFONIC L-46-7" available from Huntsman.

Suitable sulfosuccinate esters for those embodiments including one or more solid sulfosuccinate esters include any solid sulfosuccinate ester suitable for use as a surfactant, and typically are in the form of either a paste or powder. These generally include, but are not limited to, sulfosuccinate esters and mixtures of sulfosuccinate esters having the general structure:

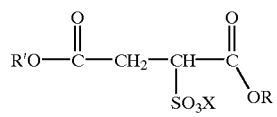 (V)

where:
R and R' may be the same or different; where R and R' represent carbon chain lengths ranging from about 6 to about 12 carbons atoms; and where R is typically an alkyl or alkyl ether; and
X=H, Na, K, NH$_4$ ion, or alternatively
X=Na, K, NH$_4$ ion In the practice of the disclosed methods and compositions, a sulfosuccinate ester may be a mono-ester, di-ester, unsymmetrical ester, or a mixture thereof. The most preferred solid sulfosuccinate ester is "AEROSOL OT-B" manufactured by Cytec.

Suitable alcohol ether sulfates for those embodiments employing one or more solid surfactants include any alcohol ether sulfate suitable for use as a surfactant, and most typically take the form of a liquid. Typically, a linear or branched alcohol ether sulfate, or mixture of linear and/or branched alcohol ether sulfates having from about 6 to about 18 carbon atoms that have been ethoxylated with from about two to about forty moles of ethylene oxide capped with a sulfate group are employed. In this regard, suitable alcohol ether sulfates include, but are not limited to, alcohol ether sulfates and mixtures of alcohol ether sulfates having the following formula:

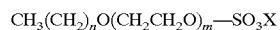 (VI)

where:
n=from about 6 to about 18 carbons arranged in branched or linear fashion;
m=from about 1 to about 40 moles of ethoxylation; and
X=H, Na, K, NH$_4$ ion, or alternatively
X=Na, K, NH$_4$ ion Most typical alcohol ether sulfates are Baker-Petrolite "AR FOAM 9451," Baker-Petrolite "AR FOAM 9452" and Witco "WITCOLATE 1259FS."

Suitable alkyl sulfates (or petroleum sulfonates) for those embodiments including one or more solid alkyl sulfates include any solid alkyl sulfate suitable for use as a surfactant, and typically are in the form of a solid or a paste. These generally include, but are not limited to, alkyl sulfates and mixtures of alkyl sulfates having the general structure:

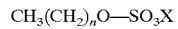 (VII)

where:
n=from about 6 to about 18 carbons arranged in branched or linear fashion; and
X=H, Na, K, NH$_4$ ion, or alternatively X=Na, K, $NH_4$ ion Most typical alkyl sulfates are lauryl sulfates. Suitable alkyl aryl sulfonates for those embodiments including one or more solid alkyl sulfates include any solid alkyl aryl sulfonate suitable for use as a surfactant, and typically are in the form of solid or paste. These generally include, but are not limited to, alkyl aryl sulfonates and mixtures of alkyl aryl sulfonates having the general structure:

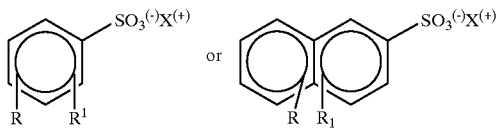

(VIII)

where:

R represents carbon chain lengths ranging from about one to about 15 carbon atoms; and where $R_1$ represents hydrogen or carbon chain lengths ranging from about one to about 15 carbon atoms; and X=H, Na, K, $NH_4$ ion, or alternatively X=Na, K, $NH_4$ ion Most typical alkyl aryl sulfonates are sodium n-butyl naphthalene sulfonates such as "MORWET B," "WITCONATE 703" and "WITCONATE 705" (available from Witco). Other examples include WITCONATE 30DS (sodium dodecylbenzene sulfonate), WITCONATE 90-F, H (sodium branched dodecylbenzene sulfonate).

Further examples of solid surfactants include, but are not limited to, those solid surfactants listed in Table 1.

TABLE 1

Solid Surfactants

| Trade Name | Physical Form | Description |
|---|---|---|
| Ethoxylated Alcohols and Alkyl Phenols | | |
| ETHOX "Ethal TDA-12" | Paste | Tridecyl alcohol |
| ETHOX "Ethal TDA-18" | Solid | Tridecyl alcohol |
| ETHOX "Ethal 926" | Paste | Lauryl alcohol |
| ETHOX "Ethal LA-23" | Solid | Lauryl alcohol |
| ETHOX "Ethal LA-50" | Solid | Lauryl alcohol |
| ETHOX "Ethal OA-23" | Solid | Oleyl alcohol |
| ETHOX "Ethal OA-35" | Solid | Oleyl alcohol |
| ETHOX "Ethal CSA-20" | Solid | $C_{16}$-$C_{18}$ alcohol |
| ETHOX "Ethal CSA-25" | Solid | $C_{16}$-$C_{18}$ alcohol |
| ETHOX "Ethal SA-20" | Solid | $C_{18}$ alcohol |
| ETHOX "Ethal DNP-18" | Paste | Dinonyl phenol |
| Ethoxylated Fatty Acids | | |
| ETHOX "MS-8" | Solid | Stearate |
| ETHOX "MS-14" | Solid | Stearate |
| ETHOX "MS-23" | Solid | Stearate |
| ETHOX "MS-40" | Solid | Stearate |
| ETHOX "MA-15" | Paste | Monomerate |
| ETHOX "TAM-25" | Solid | Tallow amine |
| ETHOX "TAM-100" | Solid | Tallow amine |
| ETHOX "HTAM-5" | Solid | Hydrogenated tallow amine |
| ETHOX "SAM-2" | Solid | Stearyl amine |
| ETHOX "SAM-10" | Solid | Stearyl amine |
| ETHOX "SAM-50" | Solid | Stearyl amine |
| Ethyoxylated Glycerides | | |
| ETHOX "CO-200" | Solid | Castor oil |
| ETHOX "Ethsorbox S-20" | Solid | Sorbitan monostearate |
| Phosphate Esters | | |
| ETHOX "ETHFAC 102" | Solid | |
| Specialty & Miscellaneous Surfactants | | |
| ETHOX "2984" | Solid | Stearic acid alkanolamide |
| Alkyl Sulfates | | |
| CHEMRON "Sulfochem SLX" | Hazy liquid to paste | Sodium lauryl sulfate |
| CHEMRON "Sulfochem SLN-95" | White needles | Sodium lauryl sulfate |
| CHEMRON "Sulfochem SLP-95" | White powder | Sodium lauryl sulfate |
| Stepan "STEPANOL MB-Dry" | White powder | Sodium lauryl sulfate |
| Stepan "STEPANOL WA-100" | White powder | Sodium lauryl sulfate |
| Stepan "STEPANOL WA-Paste" | Paste | Sodium lauryl sulfate |
| Stepan "Polystep B-3" | White powder | Sodium lauryl sulfate (alkyl sulfates) |
| Stepan "Polystep B-26" | Pale paste | Sodium cetyl-stearyl sulfate (alkyl sulfates) |
| Alkanolamides 1:1 Superamides-Diethanolamides | | |
| CHEMRON "Amidex LD" | Solid | Lauramide diethanol amine |

TABLE 1-continued

Solid Surfactants

| Trade Name | Physical Form | Description |
|---|---|---|
| Alkanolamides-Monoethanolamides | | |
| CHEMRON "Amidex CME" | Waxy flake | Cocamide monoethanol amine |
| CHEMRON "Amidex KMB" | Waxy flake | Cocamide MEA |
| CHEMRON "Amidex SME" | Waxy flake | Stearamide MEA |
| CHEMRON "Amidex LMEA" | Waxy flake | Lauramide MEA |
| Amido-Amines | | |
| CHEMRON "Chemidex C" | Soft, waxy solid | Cocamidopropyl dimethylamine |
| Alkylbenzene Sulfonates | | |
| Stepan "NACCONOL 40G" | Solid, ground flake | Sodium alkylbenzene sulfonate, linear |
| Stepan "NACCONOL 90G" | Solid, ground flake | Sodium alkylbenzene sulfonate, linear |
| Alkanolamides | | |
| Stepan "NINOL LMP" | White beads | Lauric/myristic monoethanolamide |
| Stepan "NINOL CMP" | White beads | Coconut monoethanolamide |
| Stepan "NINOL 96-SL" | Light color solid | Lauric diethanolamide |
| Stepan "NINOL 70-SL" | Solid | Lauramide diethanol amine |
| Stepan "NINOL 96-SL" | Solid | Lauramide diethanol amine |
| Stepan "NINOL L-9" | Solid | Lauramide diethanol amine |
| Stepan "NINOL LMP" | Prilled powder | Lauramide monoethanol amine |
| Stepan "NINOL 1301" | Light color paste | Fatty alkanolamide, modified |
| Nonionics | | |
| Stepan "MAKON 4" | Liquid to solid | Alkylphenoxypolyoxyethylene ethanol |
| Stepan "MAKON 6" | Liquid to solid | Alkylphenoxypolyoxyethylene ethanol |
| Stepan "MAKON 8" | Liquid to solid | Alkylphenoxypolyoxyethylene ethanol |
| Stepan "MAKON 10" | Liquid to solid | Alkylphenoxypolyoxyethylene ethanol |
| Stepan "MAKON 12" | Liquid to solid | Alkylphenoxypolyoxyethylene ethanol |
| Stepan "MAKON 14" | Liquid to solid | Alkylphenoxypolyoxyethylene ethanol |
| Stepan "MAKON 30" | Liquid to solid | Alkylphenoxypolyoxyethylene ethanol |
| Stepan "AMIDOX L-2" | Liquid to paste | Ethoxylated alkanolamides |
| Stepan "AMIDOX L-5" | Liquid to paste | Ethoxylated alkanolamides |
| Stepan "AMIDOX C-2" | Liquid to paste | Ethoxylated alkanolamides |
| Stepan "AMIDOX C-5" | Liquid to paste | Ethoxylated alkanolamides |
| Stepan Bio-Soft EA-4 | Liquid to paste | Fatty alcohol ethoxylates, modified |
| Stearyl Dimethyl Benzyl Ammonium Chloride | | |
| Stepan "AMMONYX 4" | Paste | Stearalkonium chloride |
| Stepan "AMMONYX 4B" | Paste | Stearalkonium chloride |
| Stepan "AMMONYX 4-IPA" | Paste | Stearalkonium chloride |
| Stepan "AMMONYX CA-Special" | Paste | Stearalkonium chloride |
| Stepan "AMMONYX 485" | Powder | Stearalkonium chloride |
| Stepan "AMMONYX 4002" | Powder | Stearalkonium chloride |
| Methosulfate | | |
| Stepan "STEPANQUAT 6585" | White soft paste | Dipalmethyl hydroxyethylmonium methosulfate |
| Sulfoacetate | | |
| Stepan "LATHANOL LAL" | White powder | Sodium lauryl sulfoacetate |
| Amine Oxides | | |
| Stepan "AMMONYX SO" | Paste | Stearamine oxide |
| Block Polymer | | |
| Stepan "NIPOL 2782" | Tan solid | |
| Stepan "NIPOL 4472" | Tan solid | |
| Stepan "NIPOL 5595" | Tan solid | |
| Block Copolymer | | |
| Stepan "Toximul 8322" | Amber liquid to paste | |
| Stepan "Toximul 8323" | Amber liquid to paste | |
| Sulfonates | | |
| Stepan "NACCONOL 90G" | Solid, ground flake | Sodium alkylbenzene sulfonate |

TABLE 1-continued

Solid Surfactants

| Trade Name | Physical Form | Description |
|---|---|---|
| Olefin Sulfonates | | |
| Stepan "Stepantan AS-12 Flake" | Amber flakes | Sodium alpha olefin sulfonate |
| Stepan Bio-Terge AS-90 Beads | Solid beads | Sodium alpha olefin sulfonate |
| Stepan "Stepantan A" | Tan powder | Sodium polymer sulfonate |
| Pearlescent Agents, Auxiliary Emulsifiers | | |
| Stepan "Ethylene Glycol Monostearate Pure (EGMS)" | Flakes | Glycol Stearate |
| Sodium Alkyl Sulfate | | |
| WTCO "WITCOLATE C6-10" | Solid | |
| WTCO "WITCHOLATE C5-10" | Solid | |

Combinations of solid surfactants may also be employed in the practice of the disclosed method. For example, solid alpha-olefin sulfonates may be combined with solid betaines, solid sulfosuccinate esters, and/or solid ethoxylated alcohols to provide desired foaming and/or wetting characteristics. A most typical mixture of solid surfactant chemicals includes about 27.5% "WITCONATE AOK" (or alternatively "BIOTERGE AS-90"), about 27.5% "GOLDSMITH CKD BETAINE," and about 5 % HUNTSMAN "SURFONIC L46-7."

Solid Surfactant Suspensions

Solid surfactant suspension compositions are typically prepared by combining one or more solid surfactant compounds with an organic-base fluid. As used herein, the terms "combine" or "combining" include any method suitable for admixing, exposing, contacting, or otherwise causing two or more materials, compounds, or components to come together.

In one embodiment, suitable organic base fluids typically have the property of being a fluid with which selected solid surfactant particles do not react, and being a fluid in which selected solid surfactant materials do not dissolve. An organic base fluid may be any organic fluid/s suitable for forming a suspension of solid surfactant particles, including those fluids commonly employed in oil field applications. For example, suitable organic fluids include, but are not limited to, hydrocarbon-based fluids (including derivatized or substituted hydrocarbon fluids), animal or plant-derived fluids (including derivatized or substituted vegetable or animal oils), etc. Alternatively, an organic base fluid may be a liquid surfactant or mixture of liquid surfactants, typically a mixture comprising at least one liquid surfactant having 100% activity. Examples of suitable liquid surfactant materials include, but are not limited to, those materials listed in Table 2. Further alternatively, an organic base fluid may be a mixture of liquid surfactant materials and other non-surfactant organic base fluids, such as those described elsewhere herein.

TABLE 2

Liquid Surfactants

| Trade Name | Description |
|---|---|
| Specialty & Miscellaneous Surfactants | |
| ETHOX "LF-1226" | Polyoxyalkylene glycol ether |
| ETHOX "1437" | Polyoxyalkylene glycol ether |
| ETHOX "1449" | Polyoxyalkylene glycol ether |
| ETHOX "2191" | Polyoxyalkylene glycol ether |
| ETHOX "2400" | Polyoxyalkylene glycol ether |
| ETHOX "2407" | Polyoxyalkylene glycol ether |
| ETHOX "2418" | Polyoxyalkylene glycol ether |
| ETHOX "2423" | Polyoxyalkylene glycol ether |
| ETHOX "2440" | Polyoxyalkylene glycol ether |
| ETHOX "2471" | Polyoxyalkylene glycol ether |
| ETHOX "2483" | Polyoxyalkylene glycol ether |
| ETHOX "2496" | Polyoxyalkylene glycol ether |
| ETHOX "2680" | Polyoxyalkylene glycol ether |
| ETHOX "2848" | Polyoxyalkylene glycol ether |
| ETHOX "2853" | Polyoxyalkylene glycol ether |
| ETHOX "2939" | Polyoxyalkylene glycol ether |
| ETHOX "2968" | Polyoxyalkylene glycol ether |
| ETHOX "3037" | Polyoxyalkylene glycol ether |
| ETHOX "3223" | Polyoxyalkylene glycol ether |
| ETHOX "2648" | |
| ETHOX "1372" | Polyalkylene fatty amine |
| ETHOX "COA" | Coconut diethanolamide |
| ETHOX "2449" | Modified coconut diethanolamide |
| ETHOX "2887" | Coconut diethanolamide |
| ETHOX "3166" | Tall oil diethanolamide |
| ETHOX "TAM-20DQ" | TAM-20 diethyl sulfate salt |
| ETHOX "2622" | Polyoxyethylene styrenated phenyl ether |
| ETHOX "2938" | Polyoxyethylene styrenated phenyl ether |
| ETHOX "2659" | Polyoxyethylene styrenated phenyl ether |
| SURFONIC Surface-Active Agents | |
| Texaco "Surfonic LF-17" | nonionic ethylene oxide adduct |
| Texaco "Surfonic JL-80X" | alkoxypolyalkoxyethanol |
| Alpha Olefin Sulfonate | |
| Rhône-Poulenc "Siponate" | |
| Amphoteric | |
| Rhône-Poulenc "Mirataine CB" | |
| Rhône-Poulenc "Mirataine CBS" | |
| Rhône-Poulenc "Miranol C2MSF-70" | |
| Rhône-Poulenc "Mirataine TM" | |

TABLE 2-continued

Liquid Surfactants

| Trade Name | Description |
| --- | --- |
| Fatty Alkanolamide | |
| Rhône-Poulenc "Cyclomide DC212/S" | |
| Sodium Lauryl Sulfates | |
| Rhône-Poulenc "Sipon" | |
| Alcohol Ethoxylate | |
| Rhône-Poulenc "Emulphogene BC-610" Ethylene Oxide/Propylene Oxide Block Copolymers, Polyethylene Glycols or Polypropylene Glycols | |
| Rhône-Poulenc "PEGOL F88" Rhône-Poulenc "PEGOL L64" Rhône-Poulenc "PEGOL F68" Rhône-Poulenc "PEGOL P65" Rhône-Poulenc "PEGOL F108" Alcohol Ethoxylate | |
| Rhône-Poulenc "Emulphogene LM-710" Alkanolamides | |
| Stepan "NINOL 40-CO" Nonionics | Coconut diethanolamide |
| Stepan "MAKON NF-5" | Polyalkoxylated aliphatic base |
| Stepan "MAKON NF-12" | Polyalkoxylated aliphatic base |
| Cetyl Trimethyl Ammonium Chloride | |
| Stepan "AMMONYX CETAC" | Cetrimonium chloride |
| Stepan "AMMONYX CETAC-30" | Cetrimonium chloride |
| Alkanolamides | |
| Stepan "NINOL 49-CB" | Cocamide DEA |
| Stepan "NINOL 55-LL" | Lauramide DBA |
| Stepan "NINOL 70-SL" | Lauramide DEA |
| Stepan "NINOL GR" | Cocamide DEA |
| Amine Oxides | |
| Stepan "AMMONYX CO" | Cetamine oxide |
| Stepan "AMMONYX OAO" | Oleamine oxide |
| Stepan "AMMONYX CDO" | Cocamidopropylamine oxide |
| Esters | |
| Stepan "KESSCO PEG 200-6000" | PEG-4 to PEG-150 laurate and dilaurate |
| Block Copolymer | |
| Stepan "Toximul 8321" | Block copolymer |

An organic base fluid may be a refined and/or natural fluid product. Suitable organic base fluids include, but are not limited to, diesel, kerosene, naptha, light mineral oil, condensate, crude oil, their derivatives, and mixtures thereof. Other organic fluids, such as alcohols (like isopropyl alcohol, 2-methylhexanol, etc.), alkanes (such as hexane), glycols (such as hexylene glycol, ethylene glycol "EG" available from Dow Chemical), ester materials (such as "RDPE" available from Rhone Poulenc), and derivatized alkanes (such as alkylhexane), may also be employed. Organic-based solvents known to those of skill in the art as "mutual solvents" may also be used. Examples of suitable co-solvents include mutual solvents such as glycol-ethers including, but not limited to, ethylene glycol monobutyl ether ("EGMBE"). Also suitable are more environmentally compatible natural or synthetic organic fluids such as Exxon's "ESCAID 90" or "ESCAID 110", or refined kerosene (such as "LOTOX" available from Exxon). Suitable natural organic fluids include, but are not limited to, vegetable oils such as linseed oil, palm oil, cotton seed oil, rapeseed oil, soybean oil, olive oil, canola oil, sunflower oil, peanut oil, their derivatives, and mixtures thereof.

In forming a solid surfactant organic suspension, any amount of solid surfactant material suitable for forming a suspension may be employed. In one embodiment a solid surfactant suspension comprises from about 0.05% to about 85%, alternatively from about 0.05% to about 70%, alternatively from about 0.05% to about 55%, alternatively from about 0.27% to about 50%, alternatively from about 0.5% to about 45%, and alternatively from about 10% to about 40% solid surfactant material by weight of the total weight of the solid surfactant suspension. In an alternative embodiment, a solid surfactant suspension may comprise from about 40% to about 80%, alternatively from about 40% to about 70%, alternatively from about 50% to about 70%, and alternatively from about 50% to about 60% solid surfactant material by weight of the total weight of the solid surfactant suspension. In still another embodiment, a solid surfactant organic suspension may comprise from about 45% to about 55% solid surfactant material by weight of the total weight of the solid surfactant suspension. It will be understood with benefit of the present disclosure that a solid surfactant suspension may be employed, for example as a well treating fluid, without any other additives, or alternatively with any one or any combination of any of the additives mentioned elsewhere herein.

Although a generic solid surfactant suspension is described above, it will be understood with benefit of this disclosure that by manipulating concentration of solid surfactant materials present in a solid surfactant suspension, properties and characteristics of the suspension may be varied to fit particular applications. Furthermore, solid surfactant organic suspensions described herein may be employed without polymers or other additive materials in a number of applications including, but not limited to, as a wetting agent for formation surfaces, a foamer for acid diversion, a dispersant, or as an emulsifier for acids, water gels, and acid organic or water gel-organic fluids, such as for acid fracturing using acid as the internal phase of an organic based emulsion.

In another embodiment, a solid surfactant suspension may comprise solid surfactant in an organic base fluid, and may also include an optional suspending agent/s and/or liquid surfactant/s. In this regard, such a solid surfactant solution may comprise from about 0% to about 40% solid alpha olefin sulfonate, from about 0% to about 45% liquid ethoxylated alcohol, from about 0% to about 25% solid alcohol ether sulfate, from about 0% to about 25% solid betaine, from about 0% to about 43% solid sulfosuccinate, from about 0% to about 45% solid alkyl sulfate. All of the percentage values in this paragraph are given in units of percent by weight of the total weight of the solid surfactant suspension slurry mass, and it will be understood for this particular embodiment, that concentrations of each component may be varied within these percentage ranges in any manner desired to achieve any combination of components, as long as the solid surfactant suspension comprises from about 20% to about 60%, alternatively from about 40% to about 60%, and further alternatively from about 50% to about 60% organic base fluid (diesel, mutual solvent, etc.). Furthermore, the solid surfactant suspension comprises at least about 0.05% solid surfactant, alternatively at least about 0.27% solid surfactant, alternatively at least about 0.5% solid surfactant, alternatively at least about 10% solid surfactant, alternatively at least about 40%, alternatively at least about 50% solid surfactant. In this embodiment, optional suspending agent (organophilic clay, etc.) may be present in an amount typically from about 0.5% to about 3%, although other amounts are possible. It will be understood with benefit of this disclosure that the values of this embodiment are exemplary only, and that other amounts and combinations of materials may be utilize in the practice of the disclosed method. Furthermore, it will be understood that in other embodiments, concentration of each solid surfactant may be varied outside these ranges to fit individual applications (such as water wetting, etc.) using total concentration of solid surfactant as described elsewhere herein.

In another alternative embodiment (as described in Example 1), a polymer treatment fluid may be formed by combining a solid surfactant suspension (such as those shown in Tables 3 and 4) to a hydrated polymer-containing fluid (such as that described in Examples 3 and 4) at from about 0.5% to about 3% by volume of the final treatment fluid thus formed. However, it will be understood with benefit of this disclosure that other concentration ranges of materials may be employed to form treatment fluids, and that other combination methods may be used. For example, a solid surfactant suspension may be combined with a polymer-containing organic fluid suspension prior to combination of these fluids with an aqueous fluid, or solid surfactant and polymer otherwise may be formulated in an organic-based suspension prior to exposure to aqueous fluids.

Water Wetting Uses for Solid Surfactant Suspensions

In water-wetting applications, a solid surfactant organic suspension may be introduced into a formation alone or in combination with an aqueous solution and/or other compounds to water wet formation surfaces and improve oil mobility and relative permeability to oil. Although solid surfactant organic suspensions having the concentration ranges of solid surfactant material mentioned above may be employed for this or similar applications, a solid surfactant organic suspension used for water wetting formations typically comprises from about 10% to about 50%, more typically from about 20% to about 50%, and most typically from about 30% to about 50% solid surfactant material by weight of the total weight of the solid surfactant suspension. The suspension also typically includes an organic fluid base fluid, which is typically diesel, kerosene, or any other suitable refined oil. The percentage of surfactant employed in the suspension typically remains constant regardless of application. However, applications requiring more or less solid surfactant may be accommodated by adjusting the amount of surfactant suspension added, for example, to a water-based or acid-based treating fluid.

Other Additives

In addition to an organic-based fluid and solid surfactant material, a solid surfactant suspension may also include other additive materials. In this regard, any suitable well treating additive material known to those of skill in the art may be employed. For example, suitable additive materials include, but are not limited to, wetting agents, polymer materials, weighting agents, clays (such as organophilic clays, bentonite, etc. for imparting thixotropic properties, weighting, etc.), clay control additives, fluid loss control agents (such as silica flour, 100 mesh sand, resins, starches, polymers, corn meal, etc.), suspension additives, viscosifiers, diverting agents, bridging agents, biocides, pH buffers, or mixtures thereof.

Wetting Agent Additives

Optional wetting surfactants may be used in any of the disclosed solid surfactant organic suspensions to help disperse the organic phase from the solid surfactant particles and facilitate dissolution of a solid surfactant into an aqueous solution prior to mixing with an energizing phase. Advantageously this allows a solid surfactant to be handled without premature foaming through surface equipment prior to the foaming step. Any surfactant or mixture of surfactants suitable for acting as a dispersant and/or water wetting solid surfactant particles in an organic base may be employed. Typically, such surfactants are liquid and nonionic, although other solid surfactants may also help fulfill this role. Examples of suitable wetting surfactants include, but are not limited to, alcohol ether sulfates, liquid ethoxylated alcohols, nonylphenol ethoxylates, etc. In one typical embodiment, a liquid ethoxylated alcohol surfactant may optionally be employed to facilitate dissolution of a solid surfactant into an aqueous solution. In this regard, a most typical liquid ethoxylated alcohol is an ethoxylated tridecyl alcohol known as "ICONOL TDA-6" and available from BASF.

Other suitable ethoxylated alcohol wetting surfactants include, but are not limited to, "L610-3" available from Huntsman, "L12-3" available from Huntsman, "SYNPERONIC 13/5" available from ICI, "SYNPERONIC 13/8" available from ICI. Suitable secondary alcohol ethoxylates include, but are not limited to "TERGITOL 15-S-9" available from UNION CARBIDE and "TERGITOL 15-S-5" available from UNION CARBIDE. Other suitable wetting surfactants include, but are not limited to polyethylene glycol diester of oelic acid, "400-DO" available from RP; ethox sorbitan monooleate, "PSMO-20' available from RP; and ethox castor oil, "EL-620" available from RP.

When used, a wetting surfactant is typically employed in an amount of from greater than about 0% to about 50%, more typically from greater than about 0% to about 10%, and most typically from greater than about 0% to about 5% by weight of the total weight of a solid surfactant suspension. More typically, a wetting surfactant is employed in an amount of from about 0.05% to about 50%, more typically from about 0.1% to about 10%, and most typically from about 0.3% to about 5.0% by weight of the total weight of a solid surfactant suspension.

In a most typical embodiment, a wetting agent is either a liquid ethoxylated alcohol, a liquid alcohol ether sulfate, or a mixture thereof. Advantageously, such wetting agents may be used to produce a synergistic effect with one or more solid surfactants in a solid surfactant suspension by facilitating more rapid and complete dissolution of solid surfactants into an aqueous phase than other wetting surfactants. Furthermore, liquid ethoxylated alcohols and liquid alcohol ether sulfates are environmentally compatible and, when employed alone or in mixtures with environmentally compatible solid surfactants, provide an environmentally friendly solid surfactant suspension possessing superior dissolution properties.

A liquid wetting agent (such as liquid ethoxylated alcohols and liquid alcohol ether sulfates) may be combined with an organic-based solid surfactant suspension to water wet and facilitate dissolution of solid surfactant composition(s). When a polymer is also present, such liquid agents may also facilitate solvation and hydration of particle particles. Therefore, one or more of such wetting agents may play a dual role in facilitating polymer solvation and solid surfactant dissolution. Furthermore, environmental benefits may be realized in the hydration of polymer suspensions and water-wetting of solid surfactants. In one embodiment, one or more liquid ethoxylated alcohols, liquid alcohol ether sulfates, or mixtures thereof may be added separately to a polymer suspension and a solid surfactant suspension and then mixed, added to either of a polymer suspension or a solid surfactant suspension prior to mixing, or to a mixture of polymer suspension and a solid surfactant suspension already combined.

Particulate Additives

Additive materials may be particulate in nature. In such cases, a solid surfactant component may function as, among other things, a suspending agent for such additive materials. In one embodiment, when a particulate additive material is employed, a solid surfactant organic suspension may comprise from about 0.05% to about 50% solid surfactant, from about 5% to about 60% particulate additive material, and from about 30% to about 70% organic base fluid by weight of organic suspension. However, it will be understood by those of skill in the art with benefit of this disclosure that a solid surfactant and/or particulate additive material may be present in any amount suitable for the application.

Polymer-containing solid surfactant organic suspensions may be prepared utilizing any suitable polymer material or mixture of polymer materials known in the art. For example, polymers that may be employed include, but are not limited to, polysaccharides, polyvinyl alcohols, copolymers of acrylamide (such as acrylamidomethylpropanesulfonic acid ("AMPS") co-polymers), and other polymers suitable for viscosifying, gelling, diverting, and/or controlling fluid loss in well operations, such as drilling, workovers, or hydraulic fracturing. Examples of suitable polysaccharides include, but are not limited to, polysaccharides having molecular weights of at least 1 million. Specific examples of suitable polysaccharides include, but are not limited to solvatable polysaccharides such as galactomannan gums, starch, cellulose, and their derivatives.

Polymers suitable for use in the disclosed method include, but are not limited to, natural polysaccharide polymers such as galactomannans, glucomannans, galactomannan gums, guars, cellulose materials, starches, and similar materials, as well as derivatives thereof. Suitable polygalactomannans include, but are not limited to, those polysaccharides composed primarily of glactose and manose units. Among other sources, polygalactomannans are typically found in endosperm of leguminous seeds, such as guar, locust bean, honey locust, flame tree, and *Cassia occidentialis*. Specific examples of suitable natural polysaccharide polymers include, but are not limited to, guar gum, locust bean gum, carilla gum, Karaya gum, and the like, as well as derivatives thereof. Specific examples of suitable derivatized polymers include, but are not limited to, guar derivatives such as carboxymethyl guar, carboxy methylhydroxypropyl guar; and cellulose derivatives such as carboxymethylcellulose and carboxymethylhydroxyethylcellulose. Also suitable are biopolymers such as xanthan, carrageenan, agar, schleuroglucan, their derivatives, or mixtures thereof. Additional information on such hydratable polymers may be found, for example, in U.S. Pat. No. 5,247,995, which is incorporated herein by reference in its entirety.

Most typically, a polymer additive material is employed alone or in combination with other additive materials. A polymer-containing solid surfactant organic suspension typically comprises from about 0.05% to about 50%, more typically from about 0.27% to about 30%, and most typically from about 0.5% to about 20% by weight of solid surfactant. Such a polymer-containing solid surfactant suspension also typically includes from about 5% to about 60%, even more typically from about 10% to about 50%, even more typically from about 45% to about 50%, and most typically about 48% by weight of polymer. Further, such suspensions typically include from about 30% to about 70%, more typically from about 30% to about 60%, even more typically from about 40% to about 55%, and most typically from about 45% to about 50% by weight organic base fluid, and also may optionally include from about 0% to about 10%, even more typically from about 0.1% to about 5%, and most typically from about 0.5% to about 3% by weight other additives.

The disclosed polymer solid surfactant suspensions may be used for the viscosification and/or subsequent foaming of treating fluids used in well operations. Such well operations include, but are not limited to, hydraulic fracturing or other stimulation fluids (such as acidizing fluids), drilling fluids, loss circulation fluids, well clean-out fluids, gravel pack fluids, frac pack fluids, cementing fluids (including foamed cement), unloading fluids (such as foamed treatment fluids introduced into a low bottom hole pressure well and/or formation to help unload the well), etc. Various combinations of different solid surfactants and/or solid surfactants mixed with liquid surfactants are possible. By varying types and combinations of surfactants and by varying extent of polymer solvation, viscosification, and/or foaming of a final treatment, a fluid mixture may be controlled and tailored for particular applications. In doing so, the disclosed solid surfactant suspension compositions may be used for, among other things, accurate additive delivery in oil and gas completion processes.

Use in Foamed Applications

For applications using foamed polymer-containing treatment fluids, a solid surfactant is typically present in a polymer-containing solid surfactant suspension in a concentration of from about 0.1% to about 3% by weight, alternatively from about 1% to about 3% by weight of the total weight of the polymer suspension, with polymer being present in an amount from about 45% to about 50% by weight of the total weight of the suspension. However, it will be understood with benefit of the present disclosure that concentrations of solid surfactant, polymer particles and organic carrying fluid may be varied in order to achieve varying viscosities and foaming capabilities using methods known in the art.

For example, one particular embodiment of polymer surfactant suspension for foaming treatments consists of 45.9% (by weight of total slurry mass) carboxymethylhydroxypropyl guar, 1.7% (by wt. of total slurry mass) BIOTERGE AS-90 solid alpha olefin sulfonate, 2.0% (by wt. of total slurry mass) ICONOL TDA6 liquid ethoxylated alcohol, 1.9% (by wt. of total slurry mass) EGMBE mutual solvent, 1.0% RHEOX "A140" (by wt. of total slurry mass) organophilic clay based organic fluid-compatible suspending agent, and 47.5% (wt. of total slurry mass) No. 2 diesel hydrocarbon. Successful stimulation treatments rely in part, on the accurate and precise addition of each chemical component. The accurate metering of solid additives, though possible, is generally difficult. Liquids, on the other hand, tend to be easily metered with reliable accuracy, placing the particulate polymer and surfactant together in an organic suspension, liquefies the solids for accurate delivery.

Use as a Polymer Wetting & Dispersal Agent

In another embodiment, a solid surfactant may be utilized primarily as a wetting agent for polymer dispersal and hydration, rather than for foaming purposes. In such a case, a polymer-containing solid surfactant suspension may include one or more solid surfactants and one or more polymers. When the solid surfactant is utilized primarily as a wetting agent for polymer dispersal and hydration, a most typical polymer-coating solid surfactant suspension contains solid surfactant in an amount of from about 0.1% to about 1.0% by weight of the total weight of the suspension, and polymers in the concentration from about 45% to about 50% by weight of the total weight of the suspension, with the possible concentration ranges of organic fluid being the same as described elsewhere herein.

Although solid surfactant organic suspensions including polymer particles are described above, it will be understood with benefit of the present disclosure that the disclosed solid surfactant compositions may be employed in organic suspensions with non-polymer particles. For example, silica flour, cement, magnesium oxide, fluid loss additives like "ADOMITE REGAIN" from Nalco-Exxon, etc. It will also be understood that mixtures of different types of polymers, and/or mixtures of polymer and non-polymer particles may be employed with the disclosed solid surfactant suspensions.

Solid Surfactant Suspension Preparation

In one embodiment, a solid surfactant organic suspension may be prepared by initially adding a clay based suspending agent to the organic solvent. Afterward, other liquid wetting surfactants and mutual solvents may be added. Following adequate dispersing, a solid surfactant (with or without polymer) is typically added. The polymers may be viscosifying agents for hydraulic fracturing, but the process may also include other particulate materials such as fluid loss additives, silica flour or cement.

Mixing Processes

In embodiments of the disclosed method and compositions, a solid surfactant organic suspension may be combined with an aqueous carrier fluid to create a treatment fluid using any suitable method known in the art, including batch or continuous mix processes. Typically, a solid surfactant suspension is combined with an aqueous fluid by means of either a continuous mixing or batch mixing process. Most typically a continuous mixing process is employed. By "continuous mixing" it is meant that the carrier fluid, often water, is withdrawn from its source and [treatment] treated with the designed fluid or other components while en route to the wellbore. In a typical continuous mixing process, a solid surfactant suspension (with or without polymer or other particles) is combined with an aqueous carrier fluid (such as and aqueous carrier fluid process stream). In this regard, suitable aqueous carrier fluids include, but are not limited to, fresh water, brine (such as synthetic, formation, or ocean brine), KCl water (such as 2% KCl water), KCl substitute (such as tetraethylammonium chloride) in water, ammonium chloride water, or mixtures thereof. The surfactant initially serves to water wet the particles, for example, such that polymer particles are allowed to solvate when they are present in a suspension. In those embodiments employing no additive particle materials, a solid surfactant dissolves in the aqueous fluid to form a surfactant-laden aqueous carrier fluid suitable for, among other things, water wetting formation surfaces or other surfaces, combination with other process streams, or foaming. Individual applications may depend on the concentration of solid surfactant materials employed, as discussed previously.

In one embodiment, the disclosed solid surfactant suspensions are employed in treatment fluids used in well operations including, but not limited to, drill-in, drilling, completion, cementing, stimulation, workover and remedial operations. In this capacity, a treatment fluid is typically prepared at a well site, but also may be prepared offsite. A treatment fluid may be batch prepared or prepared by continuous mix processes and then, in either case, introduced into a wellbore. In the present disclosure "introduced into a wellbore" means that the disclosed treating fluid may be pumped, injected, poured, released, displaced, spotted, circulated or otherwise placed within a well or wellbore using any suitable manner known in the art. In a typical continuous mix process, a process stream containing a solid surfactant organic suspension (with or without polymer particles) is combined with a process stream containing an aqueous-based carrier fluid. At this point, the solid surfactant is dissolved in the aqueous phase and serves to water wet and disperse the polymer particles, allowing the polymers to solvate and hydrate. Speed of solvation and hydration may be controlled by mixing conditions, such as amount of applied shear.

A solid surfactant may be combined with an aqueous carrier fluid in any ratio suitable for dissolving at least a portion of the solid surfactant particles and dispersing and hydrating polymer or other additive materials (when employed). In a continuous mix or batch mix process, a solid surfactant suspension process stream is typically combined with an aqueous carrier fluid process stream in a ratio from about 0.1% to about 10% by volume of the aqueous carrier fluid, more typically from about 0.2% to about 5% by is volume of the aqueous carrier fluid, and most typically from about 2% to about 5% by volume of the aqueous carrier fluid. These concentrations are typically employed for both solid surfactant or polymer-containing solid surfactant solutions.

In one typical continuous mix embodiment, a polymer-containing solid surfactant suspension process stream may be combined with an aqueous carrier fluid process stream prior to the wellhead, typically in those ratios listed previously, to create a fracturing gel component. In this way, a viscosified or gelled treatment fluid may be prepared for one of many well treatment uses. Desired viscosity of such a gelled treatment fluid may be adjusted by those of skill in the art with benefit of this disclosure by, for example, varying the amount of polymer employed. Should a foamed fluid be desired, an energizing phase component may be added to the gelled fluid process stream prior to introducing the fluid into a wellbore. If desired, the viscosified or gelled treatment fluid may be cross-linked using methods and cross-linker compounds known in the art. In addition, proppant material may be added to the viscosified or get treatment fluid prior to addition of the energizing phase, to achieve a proppant laden fracturing treatment fluid. Using treatment fluids prepared in this way, well treatments, such as fracturing treatments, may be performed using techniques known in the art.

In another typical continuous mix embodiment, an aqueous carrier fluid stream may be initially treated with organic based polymer suspension that may or may not contain solid surfactants. Further downstream, the resulting polymer-laden carrier fluid may then be subsequently treated with an organic-based solid surfactant suspension (as described elsewhere herein), typically in amounts to achieve a volume ratio to aqueous carrier fluid equivalent to that described above. The surfactant and polymer-laden carrier fluid may then be pumped directly to the wellbore or may be further treated as described elsewhere herein, for example with proppant, crosslinker, energized gas (for foaming applications), and/or a hydrocarbon for emulsification based applications. Examples of typical crosslinking agents include, but are not limited to, those described in U.S. Pat. Nos. 4,514,309 and 5,247,995, which are incorporated herein by reference in their entirety.

In one typical batch mix embodiment, polymer material may be prehydrated by combining and blending a polymer-containing solid surfactant suspension with a suitable aqueous carrier fluid to form a hydrated polymer solution. This hydrated polymer solution may then be pumped through a blender, where additional solid surfactant material may be added (for example for creating a foamed treatment fluid). Other additive materials as described elsewhere herein may then be added prior to introduction into a wellbore. Similar concentrations as described elsewhere herein may be employed.

As mentioned above, when a foamed well treatment fluid is desired, an energizing phase component may be employed. Such an energizing phase may be used to foam a treatment fluid that does or does not comprise polymers and/or other additives in addition to a dissolved surfactant. However, when one or more polymers are present, they may help stabilize a foamed fluid. In this regard, any energizing phase component suitable for forming a foam may be employed including, but not limited to, gaseous materials such as carbon dioxide, nitrogen, liquified petroleum gases (such as liquified natural gas and liquified petroleum gas, etc.), or a mixture thereof. Typically, a flow rate of energizing phase component sufficient to maintain a foam quality of from about 5% to about 90%, more typically from about 10% to about 80%, and most typically from about 30% to about 70% is utilized. In this regard, foam quality may be adjusted by those of skill in the art with benefit of this disclosure to fit particular applications, such as by varying the amount of solid surfactant and/or energizing phase employed. As used herein, "foam quality" refers to the ratio of gaseous phase to the sum of gaseous and liquid phases. Foamed treatment fluids may be employed with continuous or batch mixing methods. In the case of a batch mixing method, a treatment fluid containing dissolved foaming surfactants may be batch mixed, and then pulled back through a blender where an energizing phase may be introduced to create a foamed treatment fluid.

When the disclosed solid surfactant organic suspensions are employed as part of a fracture treatment fluid containing proppant materials, any proppant suitable for maintaining a fracture in, for example, an oil, gas, geothermal, coalbed methane, water or other type of subterranean well may be employed. Such fracture proppant materials include, but are not limited to, silica (such as Ottawa, Brady or Colorado Sands), fine gravel, synthetic organic particles, glass microspheres, ceramics (including aluminosilicates), resin-coated sand, sintered bauxite, and mixtures thereof. Typically, sand or synthetic fracture proppants are used. Most typically sand is used as a fracture proppant.

A proppant is typically combined with a viscosified or gelled fluid prior to the introduction of an energizing phase component The amount of proppant utilized may be varied to provide the desired amount of proppant for introduction into a formation using techniques known in the art. Advantageously, numerous combinations of solid surfactant suspensions, proppants, carrier fluids, and energizing phases may be utilized for different applications as desired.

When additives (polymers, fluid loss additives, etc.) are employed, one typical embodiment includes about 1.7% to about 4.0% of a solid surfactant (such as alpha-olefin sulfonate) by weight of total slurry mixed with about 47.5% of an organic base (such as diesel) by weight of total slurry, about 45.9% of a polymer (such as guar) by weight of total slurry, and about 0.05% to about 1.0% of a buffer (such as sodium acetate, sodium bicarbonate, etc.) by weight of total slurry to form a solid surfactant suspension. Such systems may be employed in a batch or continuous mix process.

For example, in a typical batch mix process a polymer suspension is added to an aqueous fluid, mixed and hydrated in a vessel or tank, followed by being drawn through the surface equipment where solid surfactant suspension is added to the polymer suspension solution as it is pumped.

In a typical continuous mix process, the polymer suspension and the solid surfactant suspension (typically as described in the previous paragraph) may be added at different points along a continuous carrier fluid process stream. In such cases, polymer is added to the carrier process stream (such as in a hydration unit) first to allow hydration of polymer prior to adding the solid surfactant. Solid surfactant suspension is typically added at the discharge centrifugal of the downhole blender to prevent premature foaming problems, such as pump cavitation. In another continuous mix embodiment a polymer-containing surfactant suspension formulation is employed by premixing a polymer and solid surfactant (and, typically a buffer) in one organic-based suspension (typically in the concentration ranges described above) and then pumping this suspension in a process stream and adding water to it to hydrate and foam the system as it flows downhole. The last case is most typically employed with linear gel applications, but may also be employed with cross-linked gels.

Materials for pH adjustment may also be employed to obtain desired system pH (such as for obtaining a stable system, optimum hydration, optimum cross-linking, etc.). In this regard, with benefit of this disclosure those of skill in the art will understand how pH may be controlled for any given polymer system to obtain desirable pH and stable systems. For example, pH adjusters are known to those of skill in the art and include, but are not limited to sodium hydroxide, alcohol amines, etc.

A schematic of one embodiment of surface pumping facility process flow for the disclosed method is shown in FIG. 1. In just one particular embodiment, sufficient solid surfactant suspension from vessel 16 may be provided to facilitate hydration of polymer suspension taken from vessel 14 without causing substantial foaming in a blender tub 12 or other processing equipment if so desired. In one embodiment, an aqueous carrier fluid from tanks 10 is typically added at a ratio of about 98.8% by volume relative to the solid surfactant suspension (containing from about 0.1% to about 3% solid surfactant). Addition of the aqueous carrier (for example in mixing vessel 22) causes the polymer to solvate, for example, to form a thickened polymer solution or gel. Next, optional additives, such as polymer cross-linkers, nonemulsifiers, bactericides, mixtures thereof, or other additives known to those skilled in the art of treatment additives, may be added. A proppant may also be added at this point if so desired. In those cases where a foamed treatment fluid is desired, optional additional solid surfactant suspension from vessel 16 (such as alpha-olefin sulfonate) sufficient to override the defoaming nature of the organic base may be added at 18 just prior to injection downhole. Advantageously, this optional two step solid surfactant addition process (at tanks 22 and through line 18) prevents excessive or undesired foaming of the treatment fluid in the process equipment. In those cases where foamed fluid is desired, an energizing phase may be combined with the treatment fluid just prior to introducing the fluid into the wellbore. Although one particular embodiment has been described and illustrated, it will be understood with benefit of the present disclosure that the process step order, additive component concentrations, as well as the number and types of additives may be varied to fit particular applications.

Although typical embodiments of a continuous mix process employing the disclosed solid surfactant organic suspensions has been described above, it will be understood with the benefit of the present disclosure that continuous mix embodiments employing other process stream configurations, as well as additional process streams and/or chemical components, may be employed. For example, other chemical components may be added or combined in separate process streams, including, but not limited to, separate foamers or mixtures of foamers added before or after a proppant.

In other embodiments of the disclosed methods and compositions, batch mixing processes may be employed. In still other embodiments, a well treatment fluid may be formulated with a high percentage of solid surfactant relative to aqueous fluid. Such a treatment fluid may be introduced into a subterranean formation with or without an aqueous carrier fluid and/or energizing phase. In such embodiments, dissolution of some or all of the solid surfactant may occur in situ within a formation, to water wet the formation and/or produce foam within the formation.

EXAMPLES

The following examples are illustrative and should not be construed as limiting the scope of the invention or claims thereof.

Example 1

Polymer-Containing Foamed Fluids

In Example 1, a 4 liter solution of 2% by weight potassium chloride, and 40 milliliters of a diesel-slurried carboxy methyl hydroxy propyl guar polymer were blended together to form a polymer-containing fluid. This polymer-continuing fluid mixture was then allowed to hydrate for 30 minutes while mixing at low speed using a "LIGHTING®" Mixer. The polymer-containing fluid was then divided into 250 milliliter (or 255 gram) aliquots. Surfactant-containing fluid samples containing various amounts of STEPAN "AS-90" solid Alpha Olefin Sulfonate, HUNTSMAN "L610-3" liquid ethoxylated alcohol, solid GOLDSMITH "CKD" alcohol ether sulfate, solid AEROSOL "OT-B" Betaine, solid WITCONATE "1259FS" sulfosuccinate, solid salt of lauryl sulfate, RHEOX "A140" organophilic clay suspending agent, and mutual solvent package (diesel, methyl amyl alcohol ("MAA") blended with EGMBE or hexylene glycol) were also prepared. The amount of components present in each surfactant-containing fluid sample are listed in Table 3.

For each run, a polymer-containing fluid aliquot was mixed at 400–500 rpm, introduced into a chosen surfactant-containing fluid sample at 0.5% by volume, and then allowed to dissolve for two (2) minutes. After this period the mixing speed was increased to approximately 14,000 Rpm (+/−50 Rpm). The stopwatch was restarted and the solution sheared at this speed for 60 seconds to create foam. Afterward, 250 milliliters of created foam was transferred to a 250 milliliter graduated cylinder, which was tared on a top load balance. The foam weight was recorded along with the clock time. The foam quality was calculated at 0.5% v/v and at 1.0% v/v, respectively. This was done by calculating foam volume minus liquid volume (foam weight), dividing by total measured foam volume (250 milliliters), and then multiplying by 100. Results of these calculations are given in Table 3.

Foam half-life was also calculated for each run. Foam half-life is the elapsed time required for 50% of the liquid contained in the foam to accumulate at the base of the foam in the graduated cylinder. The foam half-life liquid volume was calculated by dividing the foam weight by 2, then dividing this quotient by the foam liquid phase density. Foam half-life properties were measured (at 0.5% v/v and at 1.0% v/v, respectively) after calculating the foam quality. Results of these calculations are also given in Table 3.

The results of Example 1 show that foam quality and foam half-life at varying concentrations of foamer is exceptional or acceptable for most formulations.

TABLE 3

Results of Example 1

| | Solid Surfactant Suspension (% by Weight) | | | | | | | Foamed Fluid Characteristic | | | |
|---|---|---|---|---|---|---|---|---|---|---|---|
| | | | | | | | | Foam Quality, % gas in foam @ 0.5% v/v | Foam Half-Life, seconds @ 0.5% v/v | Foam Quality, % gass in foam @ 1.0% v/v | Foam Half-Life, seconds @ 1.0%. v/v |
| Exp. I.D. | Alpha Olefin Sulfonate | Ethoxylate Alcohol | Alcohol Ether Sulfate | Betaine | Sulfo-succinate | Alkyl Sulfate | Solvent Pkg. | Suspending Agent | loading (5 ml/liter) | loading (5 ml/liter) | loading (10 ml/liter) | loading (10 ml/liter) |
| Blank | 0 | 0 | 0 | 0 | 0 | 0 | 0 | 0 | 29.6 | 360 | N/D | N/D |
| Run 1 | 40 | 5 | 0 | 0 | 0 | 0 | 54.2 | 0.8 | 67.6 | 8580 | 69.93 | 12360 |
| Run 2 | 25 | 5 | 25 | 0 | 0 | 0 | 44.2 | 0.8 | 68.2 | 8400 | 71.8 | 10860 |
| Run 3 | 10 | 5 | 10 | 25 | 0 | 0 | 49.2 | 0.8 | 64.8 | 18480 | 73.4 | 12000 |
| Run 4 | 18 | 5 | 8 | 20 | 2.5 | 0 | 45.7 | 0.8 | 63.4 | 13500 | 71.7 | 10680 |
| Run 5 | 40 | 5 | 0 | 0 | 0 | 0 | 54.2 | 0.8 | 71.4 | 8940 | 71.4 | 11160 |
| Run 6 | 32 | 5 | 13 | 0 | 0 | 0 | 49.2 | 0.8 | 66.8 | 7620 | 72.3 | 10440 |
| Run 7 | 11.25 | 5 | 11.25 | 11.25 | 11.25 | 0 | 49.2 | 0.8 | 65.8 | 8040 | 72.3 | 8340 |
| Run 8 | 17 | 5 | 7 | 17 | 3 | 0 | 50.2 | 0.8 | 61.8 | 8220 | 72 | 10800 |
| Run 9 | 16 | 5 | 8 | 16 | 3 | 0 | 51.2 | 0.8 | 67 | 12120 | 73.4 | 8160 |
| Run 10 | 11 | 5 | 9 | 11 | 3 | 11 | 49.2 | 0.8 | 68.1 | 2400 | 72.2 | 6900 |

TABLE 3-continued

Results of Example 1

| | Solid Surfactant Suspension (% by Weight) | | | | | | | Foamed Fluid Characteristic | | | |
| --- | --- | --- | --- | --- | --- | --- | --- | --- | --- | --- | --- |
| | | | | | | | | Foam Quality, % gas in foam @ 0.5% v/v loading (5 ml/liter) | Foam Half-Life, seconds @ 0.5% v/v loading (5 ml/liter) | Foam Quality, % gass in foam @ 1.0% v/v loading (10 ml/liter) | Foam Half-Life, seconds @ 1.0%. v/v loading (10 ml/liter) |
| Exp. I.D. | Alpha Olefin Sulfonate | Ethoxylate Alcohol | Alcohol Ether Sulfate | Betaine | Sulfo-succinate | Alkyl Sulfate | Solvent Pkg. | Suspending Agent | | | |
| Run 11 | 11 | 5 | 9 | 11 | 3 | 11 | 49.2 | 0.8 | 65.8 | 7680 | 72.1 | 8460 |
| Run 12 | 0 | 5 | 0 | 0 | 43 | 0 | 51.2 | 0.8 | 11.6 | 600 | 12.4 | 660 |
| Run 13 | 0 | 0 | 0 | 0 | 0 | 45 | 54.2 | 0.8 | 65.3 | 4020 | 73.1 | 5700 |
| Run 14 | 0 | 45 | 0 | 0 | 0 | 0 | 54.2 | 0.8 | 59.1 | 3000 | 67 | 7500 |
| Run 15 | 0 | 45 | 0 | 0 | 0 | 0 | 54.2 | 0.8 | 54.2 | 3300 | 64.9 | 4320 |

In this example, foamed fluid prepared by adding solid surfactant suspension with polymer-containing fluid aliquots that comprised tap water, 2% by weight Potassium Chloride, 10 gallon per thousand (gpt) polymer suspension (containing 40 lbm carboxymethylhydroxypropyl guar); "N/D" means "not determined".

to dissolve for two minutes. Foam quality and half-life were measured as in Example 1 for each run, and the results are presented in Table 4.

The results of Example 2 show that, using 2% KCl, exceptional foam qualities may be achieved throughout the concentration range tested.

TABLE 4

Results of Example 2

| | Solid Surfactant Suspension (% by Weight) | | | | | | | Foamed Fluid Characteristic | | | |
| --- | --- | --- | --- | --- | --- | --- | --- | --- | --- | --- | --- |
| | | | | | | | | Foam Quality, % gas in foam @ 0.5% v/v loading (5 ml/liter) | Foam Half-Life, seconds @ 0.5% v/v loading (5 ml/liter) | Foam Quality, % gass in foam @ 1.0% v/v loading (10 ml/liter) | Foam Half-Life, seconds @ 1.0%. v/v loading (10 ml/liter) |
| Exp. I.D. | Alpha Olefin Sulfonate | Ethoxylate Alcohol | Alcohol Ether Sulfate | Betaine | Sulfo-succinate | Alkyl Sulfate | Solvent Pkg. | Suspending Agent | | | |
| Blank | 0 | 0 | 0 | 0 | 0 | 0 | 0 | 0 | 0 | 0 | 0 | 0 |
| Run 1 | 40 | 5 | | 0 | 0 | 0 | 54.2 | 0.8 | 78.2 | 540 | 81 | 600 |
| Run 2 | 25 | 5 | 25 | 0 | 0 | 0 | 44.2 | 0.8 | 79.4 | 60 | 81.6 | 300 |
| Run 3 | 10 | 5 | 10 | 25 | 0 | 0 | 49.2 | 0.8 | 79.6 | 360 | 81.1 | 540 |
| Run 4 | 18 | 5 | 8 | 20 | 2.5 | 0 | 45.7 | 0.8 | 78.8 | 480 | 81.3 | 300 |
| Run 5 | 40 | 5 | 0 | 0 | 0 | 0 | 54.2 | 0.8 | 82.3 | 300 | 78.7 | 360 |
| Run 6 | 32 | 5 | 13 | 0 | 0 | 0 | 49.2 | 0.8 | 79 | 360 | 82 | 360 |
| Run 7 | 11.25 | 5 | 11.25 | 11.25 | 11.25 | 0 | 49.2 | 0.8 | 78.2 | 300 | 81.7 | 300 |
| Run 8 | 17 | 5 | 7 | 17 | 3 | 0 | 50.2 | 0.8 | 79.3 | 240 | 82.1 | 240 |
| Run 9 | 16 | 5 | 8 | 16 | 3 | 0 | 51.2 | 0.8 | 82.3 | 240 | 80.8 | 240 |
| Run 10 | 11 | 5 | 9 | 11 | 3 | 11 | 49.2 | 0.8 | 79.7 | 180 | 81.8 | 240 |
| Run 11 | 11 | 5 | 9 | 11 | 3 | 11 | 49.2 | 0.8 | 79.4 | 420 | 81.6 | 240 |
| Run 12 | 0 | 5 | 0 | 0 | 43 | 0 | 51.2 | 0.8 | 3.8 | 0 | 10 | 0 |
| Run 13 | 0 | 0 | 0 | 0 | 0 | 45 | 49.2 | 0.8 | 62.9 | 0 | 66.9 | 360 |
| Run 14 | 0 | 45 | 0 | 0 | 0 | 0 | 49.2 | 0.8 | 82.5 | 240 | 81.7 | 180 |
| Run 15 | 0 | 45 | 0 | 0 | 0 | 0 | 49.2 | 0.8 | 80.7 | 240 | 81.1 | 240 |

Example 2

Non-Polymer Containing Foamed Fluids

For Example 2, the procedure of Example 1 was repeated except that 250 ml aliquots of 2% by weight potassium chloride solution were introduced into the chosen surfactant-containing fluid of each run at 0.5% by volume and allowed Example 3

Solid Surfactant Suspension

Three example solid surfactant suspension formulations were formulated. The components employed for each are detailed in respective Tables 5–7.

TABLE 5

| Component | State Liquid (L) or Solid (S) | Quantity Lab | Vol. Gals (250) | Field Mixing Per (250 Gals) | Field Mixing Per (1000 Gals) | Field Mixing Per (2000 Gals) | Specific Gravity | Weight (grams) | Volume (ml) | Amount of LFC Needed in cc 200.00 |
|---|---|---|---|---|---|---|---|---|---|---|
| Diesel | L | 16.48 | 21.90 | 21.9 | 87.6 | 175.2 | 0.8618 | 14.202464 | 16.48 | 17.52 |
| AOS | S | 27.50 | 81.22 | 305.0 | 1219.9 | 2439.7 | 0.45 | 27.5 | 61.111111 | 29.24 |
| AES | S | 7.50 | 10.95 | 83.2 | 332.7 | 665.4 | 0.91 | 7.5 | 8.2417582 | 7.97 |
| "Betaine CDK" | S | 27.50 | 73.09 | 305.0 | 1219.9 | 2439.7 | 0.5 | 27.5 | 55 | 29.24 |
| Isopropyl Alcohol ("IPA") | L | 6.40 | 8.51 | 8.5 | 34.0 | 68.0 | 0.781 | 4.9984 | 6.4 | 6.80 |
| EGMBE | L | 5.49 | 7.30 | 7.3 | 29.2 | 58.4 | 0.91 | 4.9959 | 5.49 | 5.84 |
| MAA | L | 7.14 | 9.49 | 9.5 | 38.0 | 75.9 | 0.7 | 4.998 | 7.14 | 7.59 |
| Aerosol OT-B | S | 7.50 | 36.92 | 83.2 | 332.7 | 665.4 | 0.27 | 7.5 | 27.777778 | 7.97 |
| Rheox "Bentone A-140" | S | 0.80 | 0.63 | 8.9 | 35.5 | 71.0 | 1.69 | 0.8 | 0.4733728 | 0.85 |
| Totals | | | 250.00 | | | | | 99.998764 | 188.11402 | |

TABLE 6

| Component | State Liquid (L) or Solid (S) | Quantity Lab | Vol. Gals (250) | Field Mixing Per (250 Gals) | Field Mixing Per (1000 Gals) | Field Mixing Per (2000 Gals) | Specific Gravity | Weight (grams) | Vol. (ml) | Amount of LFC Needed in cc 200.00 |
|---|---|---|---|---|---|---|---|---|---|---|
| Diesel | L | 39.68 | 58.28 | 58.3 | 233.1 | 466.2 | 0.8618 | 34.196224 | 39.68 | 46.62 |
| AOS | S | 50.00 | 163.19 | 612.8 | 2451.2 | 4902.3 | 0.45 | 30 | 111.11111 | 58.75 |
| AES | S | 0.00 | 0.00 | 0.0 | 0.0 | 0.0 | 0.91 | 0 | 0 | 0.00 |
| "Betaine CDK" | S | 0.00 | 0.00 | 0.0 | 0.0 | 0.0 | 0.5 | 0 | 0 | 0.00 |
| Isopropyl Alcohol ("IPA") | L | 6.40 | 9.40 | 9.4 | 37.6 | 75.2 | 0.781 | 4.9984 | 6.4 | 7.52 |
| EGMBE | L | 0.00 | 0.00 | 0.0 | 0.0 | 0.0 | 0.81 | 0 | 0 | 0.00 |
| MAA | L | 7.14 | 10.49 | 10.5 | 41.9 | 83.9 | 0.7 | 4.998 | 7.14 | 8.39 |
| Aerosol OT-B | L | 5.41 | 7.95 | 7.9 | 31.8 | 63.6 | 0.924 | 4.99884 | 5.41 | 6.36 |
| Rheox "Bentone A-140" | S | 0.80 | 0.70 | 9.8 | 39.2 | 78.4 | 1.69 | 0.8 | 0.4733728 | 0.94 |
| Totals | | | 250.00 | | | | | 99.991464 | 170.21448 | |

TABLE 7

| Component | State Liquid (L) or Solid (S) | Quantity Lab | Vol. Gals (250) | Field Mixing Per (250 Gals) | Field Mixing Per (1000 Gals) | Field Mixing Per (2000 Gals) | Specific Gravity | Weight (grams) | Vol. (ml) | Amount of LFC Needed in cc 200.00 |
|---|---|---|---|---|---|---|---|---|---|---|
| Diesel | L | 16.48 | 24.37 | 24.4 | 97.5 | 194.9 | 0.8618 | 14.202464 | 16.48 | 19.49 |
| AOS | S | 50.00 | 164.30 | 616.9 | 2467.7 | 4935.4 | 0.45 | 50 | 111.11111 | 59.15 |
| AES | S | 20.00 | 32.50 | 246.8 | 987.1 | 1974.2 | 0.91 | 20 | 21.978022 | 23.66 |
| "Betaine CDK" | S | 0.00 | 0.00 | 0.0 | 0.0 | 0.0 | 0.5 | 0 | 0 | 0.00 |
| Isopropyl Alcohol ("IPA") | L | 6.40 | 9.46 | 9.5 | 37.9 | 75.7 | 0.761 | 4.9984 | 6.4 | 7.57 |
| EGMBE | L | 5.49 | 8.12 | 8.1 | 32.5 | 64.9 | 0.91 | 4.9959 | 5.49 | 6.49 |
| MAA | L | 7.14 | 10.56 | 10.6 | 42.2 | 84.5 | 0.7 | 4.998 | 7.14 | 8.45 |
| Aerosol OT-B | L | 0.00 | 0.00 | 0.0 | 0.0 | 0.0 | 0.924 | 0 | 0 | 0.00 |
| Rheox "Bentone A-140" | S | 0.80 | 0.70 | 9.9 | 39.5 | 79.0 | 1.69 | 0.8 | 0.4733728 | 0.95 |
| Totals | | | 250.00 | | | | | 99.994764 | | |

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method for treating a well, comprising:
   combining a solid surfactant suspension with an aqueous carrier fluid to form a treatment fluid;
   introducing said treatment fluid into said well; and
   wherein said surfactant suspension comprises a solid surfactant suspended in an organic base fluid, said solid surfactant being substantially insoluble in said organic base fluid.

2. The method of claim 1, wherein said well penetrates a subterranean formation and further comprising introducing said treatment fluid into said formation, wherein at least a portion of said solid surfactant dissolves in said aqueous carrier fluid to water wet said formation.

3. The method of claim 1, wherein said solid surfactant comprises at least one of a solid alpha olefin sulfonate, alcohol ethoxylate, alcohol ether sulfate, betaine, sulfosuccinate ester, alkyl sulfate, alkyl aryl sulfonate or a mixture thereof.

4. The method of claim 3, wherein said solid surfactant comprises an alpha-olefin sulfonate.

5. The method of claim 4, wherein said alpha-olefin sulfonate is at least one of a sodium, ammonium or potassium alpha-olefin sulfonate, or a mixture thereof.

6. The method of claim 4, wherein said alpha-olefin sulfonate has up to about 20 carbon atoms.

7. The method of claim 4, wherein said solid surfactant further comprises a solid betaine.

8. The method of claim 7 where in said solid betaine comprises a cocoamidopropyl betaine and wherein said alpha olefin sulfonate has from about 12 to about 14 carbon atoms.

9. The method of claim 4, wherein said solid surfactant comprises alpha olefin sulfonate having at least one of the following structures:

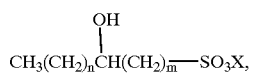

where:
m=from about 2 to about 4,
n=from about 6 to about 14, and
X=H, Na, K, NH$_4$ ion.

10. The method of claim 9, wherein said solid surfactant further comprises solid betaine having the following structure:

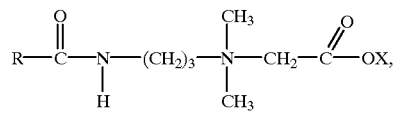

where
R=coco group typically having a mixture of chain lengths ranging from about 8 to about 16 carbon atoms, and
X=H, Na, K, NH$_4$ ion.

11. The method of claim 3, wherein said solid surfactant comprises at least one of:
solid alpha olefin sulfonate having at least one of the following structures:

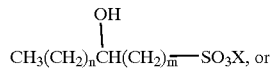

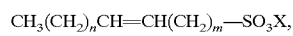

where:
m=from about 2 to about 4,
n=from about 6 to about 14, and
X=H, Na, K, NH$_4$ ion;
alcohol ethoxylate having the following structure:

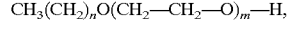

where:
n=is about 6 to about 19,
m=from about 6 to about 40;
alcohol ether sulfate having the following structure:

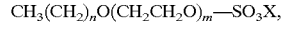

where:
n=from about 6 to about 18 carbons arranged in branched or linear fashion,
m=from about 1 to about 40 moles of ethoxylation, and
X=H, Na, K, NH$_4$ ion;
betaine having the following structure:

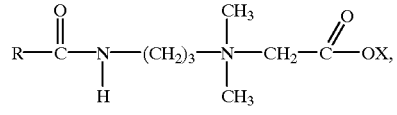

where
R=coco group typically having a mixture of chain lengths ranging from about 8 to about 16 carbon atoms, and
X=H, Na, K, NH$_4$ ion;
sulfosuccinate ester having the following structure:

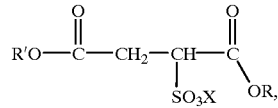

where:
R and R' may be the same or different, where R and R' represent carbon chain lengths ranging from about 6 to about 12 carbons atoms; and where
R is typically an alkyl or alkyl ether, and
X=H, Na, K, NH$_4$ ion;
alkyl sulfate having the following structure:

$$CH_3(CH_2)_nO\text{—}SO_3X,$$

where:
n=from about 6 to about 18 carbons arranged in branched or linear fashion, and
X=H, Na, K, NH$_4$ ion;
alkyl aryl sulfonate having at least one of the following structures:

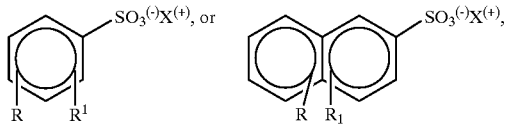

where:
R represents carbon chain lengths ranging from about one to about 15 carbon atoms; and where R$_1$ represents hydrogen or carbon chain lengths ranging from about one to about 15 carbon atoms, and
X=H, Na, K, NH$_4$ ion,
or a mixture thereof.

12. The method of claim 1, wherein said organic base fluid comprises diesel.

13. The method of claim 1, wherein said solid surfactant suspension comprises from about 50% to about 70% by weight of solid surfactant.

14. The method of claim 1, further comprising combining said treatment fluid with an energizing phase to form a foamed treatment fluid prior to introducing said treatment fluid into said well.

15. The method of claim 14 further comprising combining said solid surfactant suspension with a polymer prior to combining said solid surfactant suspension with an aqueous carrier fluid, and wherein said solid surfactant suspension comprises from about 50% to about 70% by weight of solid surfactant and from about 5% to about 60% by weight of said polymer.

16. The method of claim 15, further comprising combining proppant with said treatment fluid prior to introducing said treatment fluid into said well.

17. The method of claim 14, wherein said energizing phase is carbon dioxide, nitrogen, or a mixture thereof.

18. The method of claim 1, further comprising combining said solid surfactant suspension with additive particles prior to combining said solid surfactant suspension with an aqueous carrier fluid.

19. The method of claim 18 wherein said additive particle comprises a polymer and said treatment fluid is a polymer treatment fluid.

20. The method of claim 19 wherein said solid surfactant suspension is combined with said polymer to form a polymer-containing suspension comprising from about 50% to about 70% by weight of solid surfactant and from about 5% to about 60% by weight of said polymer.

21. The method of claim 19, further comprising combining a proppant with said treatment fluid prior to introducing said treatment fluid into said well.

22. The method of claim 19, wherein said polymer comprises a polysaccharide, a polyacrylate, or a mixture thereof.

23. The method of claim 19, wherein said polymer is crosslinked.

24. The method of claim 1, wherein said organic base fluid comprises diesel, a refined kerosene, sunflower oil, or a mixture thereof.

25. The method of claim 1, wherein said aqueous fluid comprises at least one of fresh water, brine, acid, cement slurry or a mixture thereof.

26. A method of treating a well comprising:
introducing a treatment fluid into said well;
wherein said treatment fluid comprises a suspension of solid surfactant in an organic base fluid.

27. The method of claim 26, wherein said solid surfactant suspension comprises from about 50% to about 70% by weight of solid surfactant and from about 5% to about 60% by weight of additive particles, said additive particles comprising a polymer.

28. The method of claim 26, wherein said treatment fluid further comprises additive particles suspended in said organic base fluid.

29. The method of claim 28, wherein said additive particles comprise polymer particles.

30. The method of claim 29, wherein said polymer comprises a polysaccharide, a polyacrylate, or a mixture thereof.

31. The method of claim 29, wherein said polymer is crosslinked.

32. The method of claim 26, wherein said well penetrates a subterranean formation having a saturation of water, and wherein said solid treatment fluid is introduced into said subterranean formation so that at least a portion of said solid surfactant dissolves in said formation water to water wet said formation, to form a foam, or a mixture thereof.

33. The method of claim 26, wherein said solid surfactant comprises at least one of a solid alpha olefin sulfonate, alcohol ethoxylate, alcohol ether sulfate, betaine, sulfosuccinate ester, alkyl sulfate, alkyl aryl sulfonate or a mixture thereof.

34. The method of claim 33, wherein said solid surfactant comprises at least one of:
solid alpha olefin sulfonate having at least one of the following structures:

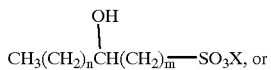

where:
m=from about 2 to about 4,
n=from about 6 to about 14, and
X=H, Na, K, NH$_4$ ion;
alcohol ethoxylate having the following structure:

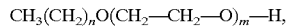

where
n is about 7 to about 19
m is from about 6 to about 40;
alcohol ether sulfate having the following structure:

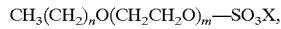

where:

n=from about 6 to about 18 carbons arranged in branched or linear fashion,
m=from about 1 to about 40 moles of ethoxylation, and
X=H, Na, K, $NH_4$ ion;

betaine having the following structure:

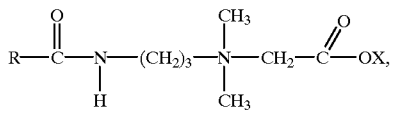

where
R=coco group typically having a mixture of chain lengths ranging from about 8 to about 16 carbon atoms, and
X=H, Na, K, $NH_4$ ion;

sulfosuccinate ester having the following structure:

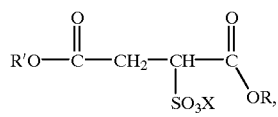

where:
R and R' may be the same or different; where R and R' represent carbon chain lengths ranging from about 6 to about 12 carbons atoms; and where R is typically an alkyl or alkyl ether, and
X=H, Na, K, $NH_4$ ion;

alkyl sulfate having the following structure:

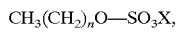

$CH_3(CH_2)_nO-SO_3X$, where:
n=from about 6 to about 18 carbons arranged in branched or linear fashion, and
X=H, Na, K, $NH_4$ ion;

alkyl aryl sulfonate having at least one of the following structures:

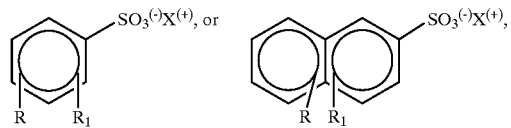

where:
R represents carbon chain lengths ranging from about one to about 15 carbon atoms; and where $R_1$ represents hydrogen or carbon chain lengths ranging from about one to about 15 carbon atoms, and
X=H, Na, K, $NH_4$ ion; or
a mixture thereof.

35. The method of claim 33, wherein said solid surfactant comprises an alpha-olefin sulfonate.

36. The method of claim 35, wherein said solid surfactant comprises alpha olefin sulfonate having at least one of the following structures:

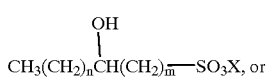

where:
m=from about 2 to about 4,
n=from about 6 to about 14, and
X=H, Na, K, $NH_4$ ion.

37. The method of claim 36, wherein said solid surfactant further comprises solid betaine having the following structure:

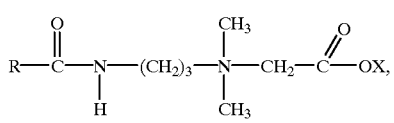

where
R=coco group typically having a mixture of chain lengths ranging from about 8 to about 16 carbon atoms, and
X=H, Na, K, $NH_4$ ion.

38. The method of claim 35, wherein said alpha-olefin sulfonate is at least one of a sodium, ammonium or potassium alpha-olefin sulfonate, or a mixture thereof.

39. The method of claim 35, wherein said alpha-olefin sulfonate has up to about 20 carbon atoms.

40. The method of claim 35, wherein said solid surfactant further comprises a solid betaine.

41. The method of claim 40, wherein said solid betaine comprises a cocoamidopropyl betaine and wherein said alpha olefin sulfonate has from about 12 to about 14 carbon atoms.

42. The method of claim 26, wherein said organic base fluid comprises diesel, a refined kerosene, sunflower oil, or a mixture thereof.

43. The method of claim 26, wherein said organic base fluid comprises diesel.

44. The method of claim 26, wherein said solid surfactant suspension comprises from about 50% to about 70% by weight of solid surfactant.

45. The method of claim 26, further comprising combining said treatment fluid with an energizing phase.

46. The method of claim 45, wherein said energizing phase is carbon dioxide, nitrogen, or a mixture thereof.

47. The method of claim 26, wherein said treatment fluid further comprises an aqueous fluid comprising at least one of fresh water, brine, acid, cement slurry or a mixture thereof.

* * * * *